US012584452B1

(12) United States Patent
Dayaram Patil et al.

(10) Patent No.: US 12,584,452 B1
(45) Date of Patent: Mar. 24, 2026

(54) NORMAL OPERATION MODEL GENERATION AND ANOMALY DETECTION FOR A COMMON RAIL INTERNAL COMBUSTION ENGINE

(71) Applicant: Intangles Lab Private Ltd., Pune (IN)

(72) Inventors: Bhushan Dayaram Patil, Pune (IN); Hariharan Ravishankar, Bengaluru (IN); Vikram Reddy Melapudi, Bengaluru (IN); Abhijit Vishwas Patil, Bengaluru (IN); Shafaq Ansari, Pune (IN); Nishant Srivastava, Ghaziabad (IN); Harleen Kaur Bagga, Bhopal (IN); Mukund Nagare, Pune (IN); Aman Singh, Pune (IN)

(73) Assignee: Intangles Lab Private Ltd., Pune (IN)

( * ) Notice: Subject to any disclaimer, the term of this patent is extended or adjusted under 35 U.S.C. 154(b) by 0 days.

(21) Appl. No.: 18/966,864

(22) Filed: Dec. 3, 2024

(51) Int. Cl.
*F02D 41/22* (2006.01)
*F02D 41/38* (2006.01)

(52) U.S. Cl.
CPC ......... *F02D 41/22* (2013.01); *F02D 41/3809* (2013.01); *F02D 2041/224* (2013.01); *F02D 2200/0602* (2013.01); *F02D 2200/101* (2013.01)

(58) Field of Classification Search
CPC ................. F02D 41/22; F02D 41/3809; F02D 2041/224; F02D 2200/0602; F02D 2200/101
See application file for complete search history.

(56) References Cited

U.S. PATENT DOCUMENTS

2008/0243401 A1* 10/2008 Viele ........................ G06F 30/23 702/50
2013/0275026 A1* 10/2013 Methil-Sudhakaran ..................... F02M 65/003 701/34.4
2018/0216566 A1* 8/2018 Taxon ................. F02D 41/3845

FOREIGN PATENT DOCUMENTS

CN 102016271 A * 4/2011 ......... F02D 41/3836
DE 102011080989 A1 * 2/2013 ............. F02D 41/22
WO WO-2009132897 A1 * 11/2009 ......... F02D 41/3836

* cited by examiner

*Primary Examiner* — Hung Q Nguyen
(74) *Attorney, Agent, or Firm* — Dennemeyer & Associates LLC

(57) ABSTRACT

A method for generating a normal operation model indicative of a normal operational condition of a fuel rail of a common rail internal combustion engine. The method comprises receiving, from an engine management system of the common rail internal combustion engine via a data interface, engine model data obtained periodically during operation of the common rail internal combustion engine. The engine model data comprises fuel rail pressure data indicative of a fuel rail pressure of the fuel rail and engine speed data indicative of an engine speed of the engine. The method further comprises storing the engine model data in a memory. The engine model data is accumulated over a sampling time period. The method further comprises dividing, by a processor, the fuel rail pressure data into a predetermined number of engine speed bins derived from the engine speed data during the sampling time period so as to generate binned engine model data indicative of frequency of occurrence of fuel rail pressures within each bin, and generating, by the processor for each bin of the predetermined number of bins, statistical attribute model data based on the binned engine model data. The method also comprises generating, by the processor, the normal opera- (Continued)

tion model based on the statistical attribute model data for each bin when taken together, and storing, in the memory, the normal operation model for comparison with engine test data accumulated over a detection time period for enabling detection of an anomaly in an operational condition of the fuel rail based on comparison between the engine test data accumulated over the detection time period and the statistical attribute model data of the normal operation model.

29 Claims, 10 Drawing Sheets

NORMAL OPERATION MODEL GENERATION AND ANOMALY DETECTION FOR A COMMON RAIL INTERNAL COMBUSTION ENGINE

TECHNICAL FIELD

The present disclosure relates to normal operation model generation and anomaly detection for a common rail internal combustion engine. Examples of the present disclosure relate to a method for generating a normal operation model indicative of a normal operational condition of a fuel rail of a common rail internal combustion engine, and a method for detecting an anomaly in an operational condition of a fuel rail of a common rail internal combustion engine based on comparison with a normal operation model, as well as a computer program for executing the methods and non-transitory tangible computer-readable media having stored thereon a computer program for executing the methods. Further examples of the disclosure relate to a model generating system for generating a normal operation model indicative of a normal operational condition of a fuel rail of a common rail internal combustion engine, and a detection system for detecting an anomaly in an operational condition of a fuel rail of a common rail internal combustion engine based on comparison with a normal operation model.

BACKGROUND

Common rail internal combustion engines, such as common rail diesel engines or common rail compressed natural gas (CNG) engines utilise a common rail and injector system to inject fuel from the common rail to combustion chambers of the engine. Common rail fuel injection systems typically provide a more controlled quantity of atomised fuel to the combustion chambers, which helps provide improved fuel economy, reduction ins exhaust emission, and a decrease in engine noise during operation.

Fuel pressure within the common rail is typically monitored using a fuel rail pressure sensor, and the fuel pressure in the common rail may be controlled using a suitable controller and associated valves and pumps of the fuel system based on engine speed to help optimise emissions and performance while helping to ensure engine durability is not compromised. At optimal fuel pressure of the common rail, smaller droplets of fuel may be formed, resulting in a better air-fuel mixture, and so the combustion efficiency of the fuel is typically improved. Furthermore, smoke emission is typically reduced at higher injection pressures. The fuel pressure in the common rail is typically controlled using a combination of proportional-integral derivative (PID) feedback control and feedforward control of a fuel pump and release valve of the fuel injection system However, if the fuel pressure of the common rail is not in an optimal range based on the operational conditions of the engine, or if there are over or under pressure issues with the common rail, for example due to fuel leaks, then engine performance and emissions may be negatively affected. For example, too low a fuel pressure in the common rail may mean that not enough fuel gets to the engine, and/or there is too much air admitted, thus causing engine performance issues and increases in emissions. If the fuel pressure in the common rail is too high, then the increase of fuel injected into the engine may cause poor fuel economy, and may potentially cause engine misfires.

While there are different techniques for common rail pressure control aimed at achieving the desired performance, such techniques often do not take into account the physical condition of the fuel injection system, for example degradation of operational effectiveness over time due to wear and tear, or fuel leaks. Therefore, any physical or operational issues with the fuel injection system and the common rail may not be found until a significant event such as an engine breakdown occurs, or during servicing of the engine as part of a regular service schedule. This may mean that the engine could be operating under sub-optimal conditions for some time, without problems being discovered. Furthermore, a particular control model stored in an engine controller for controlling the fuel pressure in the common rail, for example based on engine speed may no longer be appropriate for achieving the optimal operation of the engine. The resulting decreases in fuel efficiency and associated rises in cost, as well as increases in emissions may be particularly significant when considering that lorries for long haul freight operations typically use common rail diesel engines as their power units.

It is an object of the subject matter of the present disclosure to at least address or alleviate the above problems.

SUMMARY

Examples of the present disclosure seek to address or at least alleviate the above problems.

In a first aspect, there is provided a method for generating a normal operation model indicative of a normal operational condition of a fuel rail of a common rail internal combustion engine, the method comprising: receiving, from an engine management system of the common rail internal combustion engine via a data interface, engine model data obtained periodically during operation of the common rail internal combustion engine, the engine model data comprising fuel rail pressure data indicative of a fuel rail pressure of the fuel rail and engine speed data indicative of an engine speed of the engine; storing the engine model data in a memory, the engine model data being accumulated over a sampling time period; dividing, by a processor, the fuel rail pressure data into a predetermined number of engine speed bins derived from the engine speed data during the sampling time period so as to generate binned engine model data indicative of frequency of occurrence of fuel rail pressures within each bin; generating, by the processor for each bin of the predetermined number of bins, statistical attribute model data based on the binned engine model data; generating, by the processor, the normal operation model based on the statistical attribute model data for each bin when taken together; and storing, in the memory, the normal operation model for comparison with engine test data accumulated over a detection time period for enabling detection of an anomaly in an operational condition of the fuel rail based on comparison between the engine test data accumulated over the detection time period and the statistical attribute model data of the normal operation model.

In a second aspect, there is provided a model generating system for generating a normal operation model indicative of a normal operational condition of a fuel rail of a common rail internal combustion engine, the system comprising: a data interface configured to receive, from an engine management system of the common rail internal combustion engine, engine model data obtained periodically during operation of the common rail internal combustion engine, the engine model data comprising fuel rail pressure data indicative of a fuel rail pressure of the fuel rail and engine speed data indicative of an engine speed of the engine; a memory configured to store the engine model data, the engine model data being accumulated over a sampling time period; and a processor configured to: divide the fuel rail pressure data into a predetermined number of engine speed bins derived from the engine speed data during the sampling time period so as to generate binned engine model data indicative of frequency of occurrence of fuel rail pressures within each bin; generate, for each bin of the predetermined number of bins, statistical attribute model data based on the binned engine model data; and generate the normal operation model based on the statistical attribute model data for each bin when taken together, in which the memory is configured to store the normal operation model for comparison with engine test data accumulated over a detection time period for enabling detection of an anomaly in an operational condition of the fuel rail based on comparison between the engine test data accumulated over the detection time period and the statistical attribute model data of the normal operation model.

Accordingly, for example, a more accurate model may be generated that is indicative of the normal operational condition of the fuel rail of the common rail internal combustion engine. This may further help improve pre-emptive prediction of possible defects in the common rail fuel injection system of the engine before an error fault code is generated by the engine control unit (ECU) of the engine, because the model, being based on the accumulated engine data over the sampling time period may more accurately represent the normal operation of the engine for comparison with the engine test data accumulated over the detection time period.

In a third aspect, there is provided a method for detecting an anomaly in an operational condition of a fuel rail of a common rail internal combustion engine based on comparison with a normal operation model generated according to the first aspect, the method comprising: receiving, from an engine management system of the common rail internal combustion engine via a data interface, engine test data obtained periodically during operation of the common rail internal combustion engine, the engine test data comprising fuel rail pressure data indicative of a fuel rail pressure of the fuel rail and engine speed data indicative of an engine speed of the engine; storing the engine test data in a memory, the engine test data being accumulated over a detection time period; dividing, by a processor, the fuel rail pressure data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model; generating, by the processor for each bin of the predetermined number of bins, statistical attribute test data based on the binned engine test data; comparing, by the processor for each bin, the statistical attribute test data with the statistical attribute model data of the normal operation model; and generating, by the processor, an alert based on if the comparison between the statistical attribute test data and the statistical attribute model data of the normal operation model over the detection time period meets a predetermined condition.

In a fourth aspect, there is provided a detection system for detecting an anomaly in an operational condition of a fuel rail of a common rail internal combustion engine based on comparison with a normal operation model generated using the system of the third aspect, the detection system comprising: a data interface configured to receive, from an engine management system of the common rail internal combustion engine, engine test data obtained periodically during operation of the common rail internal combustion engine, the engine test data comprising fuel rail pressure data indicative of a fuel rail pressure of the fuel rail and engine speed data indicative of an engine speed of the engine; a memory configured to store the engine test data, the engine test data being accumulated over a detection time period; and a processor configured to: divide the fuel rail pressure data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model; generate, for each bin of the predetermined number of bins, statistical attribute test data based on the binned engine test data; compare, for each bin, the statistical attribute test data with the statistical attribute model data of the normal operation model; and generate an alert based on if the comparison between the statistical attribute test data and the statistical attribute model data of the normal operation model over the detection time period meets a predetermined condition.

In a fifth aspect, there is provided a detection system for detecting an anomaly in an operational condition of a fuel rail of a common rail internal combustion engine based on comparison with a normal operation model, the normal operation model comprising statistical attribute model data previously generated from binned engine model data of the common rail internal combustion engine operating under normal operational conditions, in which the binned engine model data has been generated by dividing fuel rail pressure data of engine model data obtained from the common rail internal combustion engine into a predetermined number of engine speed bins, the engine model data comprises fuel rail pressure model data indicative of a fuel rail pressure of the fuel rail and engine speed model data indicative of an engine speed of the engine, the predetermined number of engine speed bins are derived from the engine speed data during a sampling time period, and the binned engine model data is indicative of frequency of occurrence of fuel rail pressures within each bin, the detection system comprising: a data interface configured to receive, from an engine management system of the common rail internal combustion engine, engine test data obtained periodically during operation of the common rail internal combustion engine, the engine test data comprising fuel rail pressure test data indicative of a fuel rail pressure of the fuel rail and engine speed test data indicative of an engine speed of the engine; a memory configured to store the engine test data, the engine test data being accumulated over a detection time period; and a processor configured to: divide the fuel rail pressure test data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model; generate, for each bin of the predetermined number of bins, statistical attribute test data based on the binned engine data; compare, for each bin, the statistical attribute test data with the statistical attribute model data of the normal operation model; and generate an alert based on if the comparison between the statistical attribute test data and the statistical attribute model data of the normal operation model over the detection time period meets a predetermined condition.

For example, if the predetermined condition is met, then an alert can be generated indicating that there is an anomaly in the operation of the fuel rail, for example, too low a pressure, or too high a pressure. A user may thus be notified that remedial action might need to be taken, for example, to physically check the fuel injection system for leaks. Accordingly, problems with the fuel rail and fuel injection system are more likely to be detected earlier, and possible breakdown may be predicted and preemptive action taken. In other words, for example, possible problems with the fuel rail system may be predicted earlier and before an error fault code is generated by the engine control unit (ECU) of the engine, and remedial actions or repairs may be 30 carried out earlier, this helping to reduce downtime of the vehicle and potentially reducing costs of repair.

Furthermore, for example, operational conditions of the engine, such as a particular control model stored in the engine controller for controlling the fuel pressure in the common rail, could be adjusted in response to the alert, to help achieve more optimal operation of the engine, such as improved emissions and/or fuel economy.

Other aspects and features are defined in the appended claims.

BRIEF DESCRIPTION OF THE DRAWINGS

Examples of the disclosure will now be described by way of example only with reference to the accompanying drawings, in which like references refer to like parts, and in which.

DETAILED DESCRIPTION

A normal operation model generation and anomaly detection for a common rail internal combustion engine is disclosed. In the following description, a number of specific details are presented in order to provide a thorough understanding of the examples of the disclosure. It will be apparent however to a person skilled in the art that these specific details need not be employed in order to practise the examples of the disclosure. Conversely, specific details known to the person skilled in the art are omitted for the purposes of clarity in presenting the examples.

Figure 1:
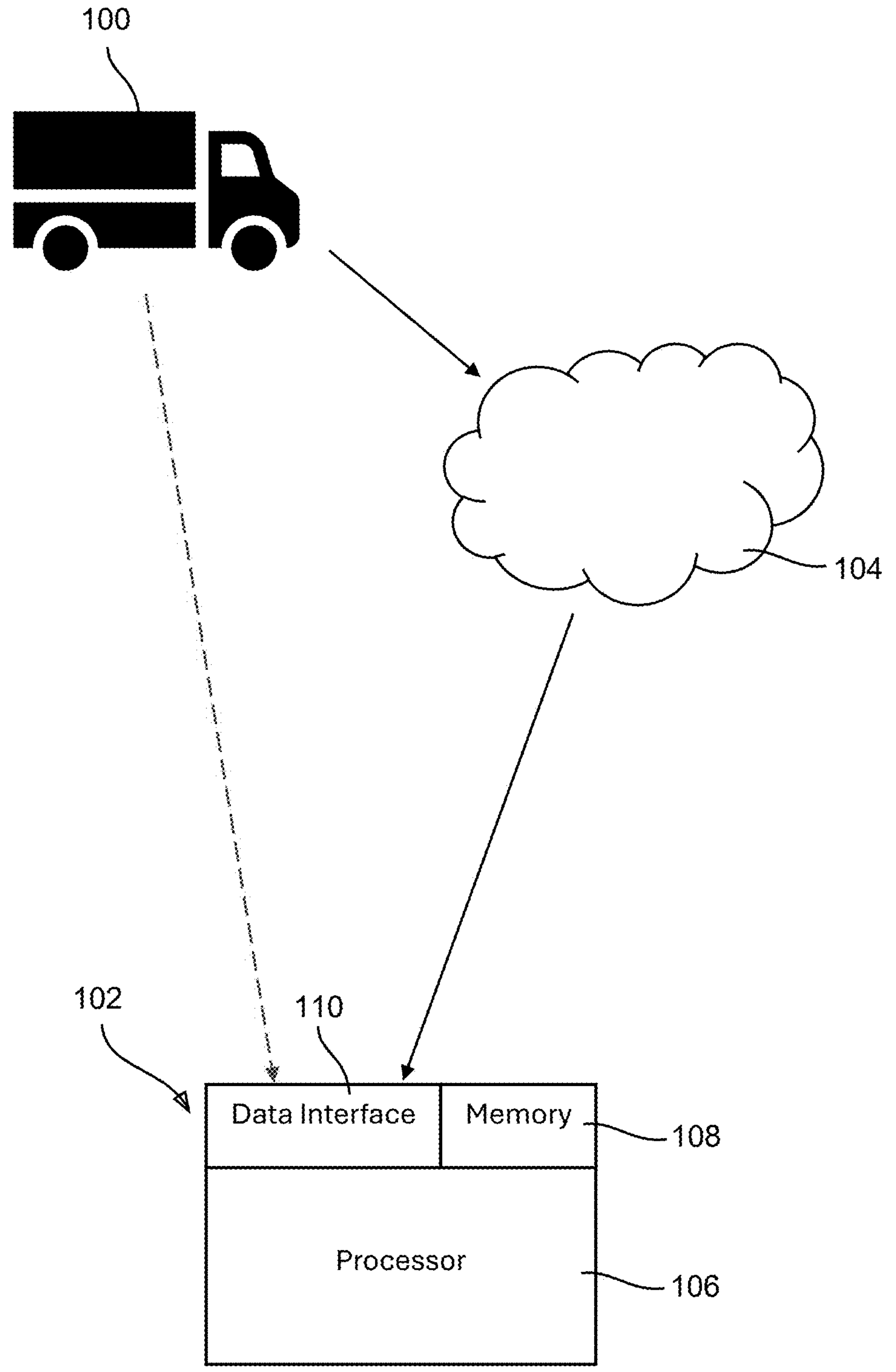
FIG. 1 schematically shows an arrangement for collecting engine data according to examples of the disclosure.

FIG. 1 schematically shows an arrangement for collecting engine data according to examples of the disclosure. A vehicle 100 comprises a common rail internal combustion engine (CR-ICE), such as a common rail diesel engine or a common rail CNG engine. The engine may be provided with sensors, for example mounted on or around the engine, for monitoring operational parameters and conditions of the engine. The sensors may detect different modalities and provide measurements used by an engine management system of the engine to calculate various performance parameters. Such sensors may include as examples, sensors for determining common rail fuel pressure of a fuel rail of the engine, engine load, engine speed, and throttle value data, although it will be appreciated that other sensors could be used, as appropriate. The data from such sensors may, for example, be used by an engine control unit (ECU) to control the common rail fuel pressure based on engine speed.

Engine data from the sensors may be provided to a telematics gateway unit for communication to a computing system 102, such as a model generation system or detection system as described herein. In some examples, the engine data may be provided to the computing system 102 via a cloud based, or distributed computing network 104. The computing system 102 may be separate from the vehicle 100 and may form part of the distributed computing network 104. Alternatively, the computing system 102 may be provided onboard the vehicle 100. The engine data may include one or more of: fuel rail pressure data indicative of a fuel rail pressure of the fuel rail; engine speed data indicative of an engine speed of the engine; throttle data indicative of a throttle value of the engine; and engine load data indicative of an engine load value of the engine.

The computing system comprises a processor 106, and memory 108, and a data interface 110, which are configured to cooperate together, for example based on computer executable instructions stored in the memory 108 to implement the techniques and methods described herein.

Figure 2A:
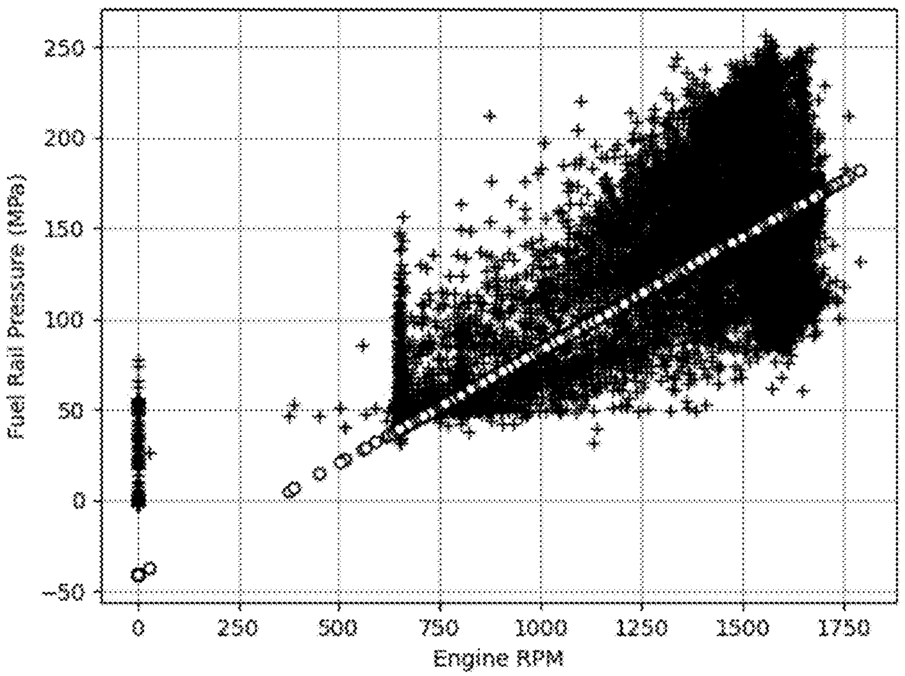
FIGS. 2*a* and 2*b* show example graphs of fuel rail pressure and engine speed.
Figure 2B:
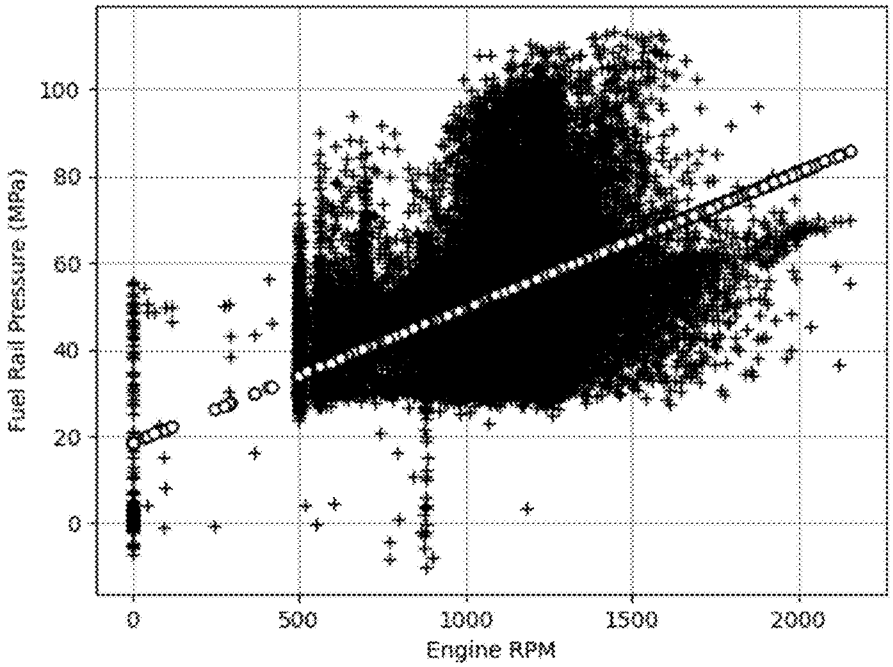

FIGS. 2*a* and 2*b* show example graphs of fuel rail pressure and engine speed of a common rail diesel engine. In particular, FIGS. 2*a* and 2*b* show examples of engine data obtained from engine sensors comprising fuel rail pressure data indicative of a fuel rail pressure of the fuel rail of the engine plotted as "+" on the y-axis against engine speed data (in revolutions per minute, RPM) on the x-axis. A straight-line fit (indicated as hollow circles "o") to this data is plotted and may be used as a basis for fuel rail pressure control by the ECU using known techniques. Engine data obtained from an engine may be used to generate a normal operation model indicative of a normal operational condition of a fuel rail of a common rail internal combustion engine. Such engine data may also be used to detect an anomaly in an operational condition of a fuel rail of a common rail internal combustion engine based on comparison with a normal operation model. For example, on-board diagnostics parameter IDs (OBD PIDs) according to known standards may be used by the system 102 to obtain the engine data from the vehicle 100.

A method 300 for generating a normal operation model indicative of a normal operational condition of a fuel rail of a common rail internal combustion engine according to examples of the disclosure will now be described with reference to FIGS. 3 to 5. In the examples described with reference to FIGS. 3 to 5, it is assumed that there are no fault codes (fuel rail pressure related fault codes as well as non-fuel rail pressure associated fault codes) indicated by the engine during the time period over which the engine data is collected. Engine data provided by the vehicle 100 can thus be considered to be engine model data i.e. engine data used for modelling the normal operational condition of the fuel rail.

At a step s310, the computing system 102 receives the engine model data from the vehicle 100 via the data interface 110. The engine model data may be obtained periodically during operation of the CR-ICE, for example based on OBD PID communication. The engine model data may comprise fuel rail pressure data indicative of a fuel rail pressure of the fuel rail and engine speed data indicative of an engine speed of the engine, for example as illustrated in FIGS. 2*a*, and 2*b*.

At a step s320, the engine model data is stored in the memory 108 and is accumulated over a sampling time period. The sampling time period may be chosen to provide a suitable snapshot of operation of the engine under normal conditions. In some examples, to help further ensure that the engine model data that is accumulated is indicative of a normal operational condition of the fuel rail, the sampling time period is chosen such that are no fault codes (fuel rail pressure related fault codes as well as non-fuel rail pressure associated fault codes) indicated by the engine during the sampling time period, as well as no engine fault codes occurring within a predetermined time before and after the sampling time period.

In some examples, the engine model data may be filtered according to one or more criteria before storing in the memory 108. This helps remove data that may not be representative of a normal operational condition of the engine, for example, when the engine speed is outside a particular torque range, which could lead to common rail pressures that are not indicative of usual operation of the common rail. The engine model data may also be filtered based on engine load and/or an engine throttle value, as will be described in more detail later below with reference to FIG. 5. However, it will be appreciated that other operational parameters of the engine could be used to filter the engine model data before storing, as appropriate.

The processor may remove a portion of the engine model data that lies within a fuel rail pressure outlier threshold range from at least one of a lowest value of the fuel rail pressure data and a highest value of the fuel rail pressure data of the engine data. In other words, for example, only engine model data that lies within a fuel rail pressure sampling range (which excludes the fuel rail pressure outlier threshold range that corresponds to a bottom and/or top range of values) may be retained. This helps remove outlier engine model data, for example on the extremes of the data range, thus helping to improve the accuracy of the model and reduce the influence of spurious data. In some implementations the fuel rail pressure threshold range corresponds to a range of values lying within a certain percentage of the whole range of fuel pressure values from the highest and/or lowest value of the fuel rail pressure values in the fuel rail pressure data.

In some examples, the processor may remove a certain percentage of the lowest and/or highest values of the fuel rail pressure data along with the associated engine model data, and may retain only the engine model data that lies within the fuel rail pressure sampling range. For example, the processor may remove the lowest 5% of the fuel rail pressure data and the highest 5% of the fuel rail pressure data while retaining the middle 90% of the fuel rail pressure data, although it will be appreciated that other suitable percentages could be used such as 1%, 2%, 10%, and 20% instead of 5%. In some examples, the engine model data may be removed corresponding to only the upper end of the range or only the lower end of the range of the fuel rail pressure data values, although generally the normal operation model may be improved by removing engine model data corresponding to both the high end and low end of the fuel rail pressure data values. Although the examples above refer to fuel rail pressure outlier threshold range being based on percentages of the data range, it will also be appreciated that this could be based on values of the fuel rail pressure data rather than based on a percentage of the whole range of the fuel rail pressure data values.

At a step s330, the processor 106 divides the fuel rail pressure data into a predetermined number of engine speed bins derived from the engine speed data during the sampling time period so as to generate binned engine model data indicative of frequency of occurrence of fuel rail pressures within each bin. For example, the number of bins when taken together may be chosen to cover all or part of the fuel rail pressure values of the fuel rail pressure data. In an example, the predetermined number of bins is 4, 5, or 6, although it will be appreciated that any suitable number of bins could be used. A higher number of bins helps provide a more detailed and accurate normal operation model, but may take longer to generate, and increases lag time when the normal operation model is used to detect fuel rail pressure anomalies in operation of the engines. A lower number of bins is requires less processing to generate, and may help increase detection speed (reduce detection lag), but is less accurate and so may increase the number of false positives when being used to detect fuel rail pressure anomalies. Therefore, the number of bins may be chosen to provide a balance between detection accuracy and detection lag.

In some examples, the size of each bin is the same, although it will be appreciated they could be different. For example, a first bin (Bin 1) could comprise the fuel rail pressure values falling within the first 0-20% of the entire range of fuel rail pressure values starting from the lowest value, a second bin (Bin 2) comprise the fuel rail pressure values falling within 20-40% of values within the entire range of fuel rail pressure values starting from the lowest value, a third bin (Bin 3) could comprise the fuel rail pressure values falling within 40-60% of values within the entire range of fuel rail pressure values starting from the lowest value, a fourth bin (Bin 4) could comprise the fuel rail pressure values falling within 60-80% of values within the entire range of fuel rail pressure values starting from the lowest value, and a fifth bin (Bin 4) could comprise the fuel rail pressure values falling within 80-100% of values within the entire range of fuel rail pressure values starting from the lowest value.

As mentioned above, the processor may remove a portion of the engine model data that lies within a fuel rail pressure threshold range from at least one of a lowest value of the fuel rail pressure data and a highest value of the fuel rail pressure data of the engine data. This removal processing may be carried out before the step s330, or it could be carried out before the step s320. For example, if the bottom 5% and top 5% of fuel rail pressure values and their corresponding engine model data are removed before binning, and five bins are used, then each bin comprises the respective fuel rail pressure values falling within the following percentage ranges of values within the entire range of fuel rail pressure values starting from the lowest value: Bin 1=5-18%, Bin 2=18-41%, Bin 3=41-59%, Bin 4=59-77%, and Bin 5=77-95%. In another example, using four bins, each bin could comprise the respective fuel rail pressure values falling within the following percentage ranges of values within the entire range of fuel rail pressure values starting from the lowest value: Bin 1=5-25%, Bin 2=25-50%, Bin 3=50-75%, and Bin 4=75-95%.

Alternatively, the fuel rail pressure data may be divided into bins based on fuel rail pressure values rather than percentages of the entire fuel rail pressure value range, for example Bin 1=50-100 MPa, Bin 2=100-150 MPa, Bin 3=150-200 MPa, Bin 4=250-300 MPa, and Bin 5=300-350 MPa. However, it will be appreciated that other techniques and implementations may be used to divide the fuel rail pressure data into bins.

Figure 4:
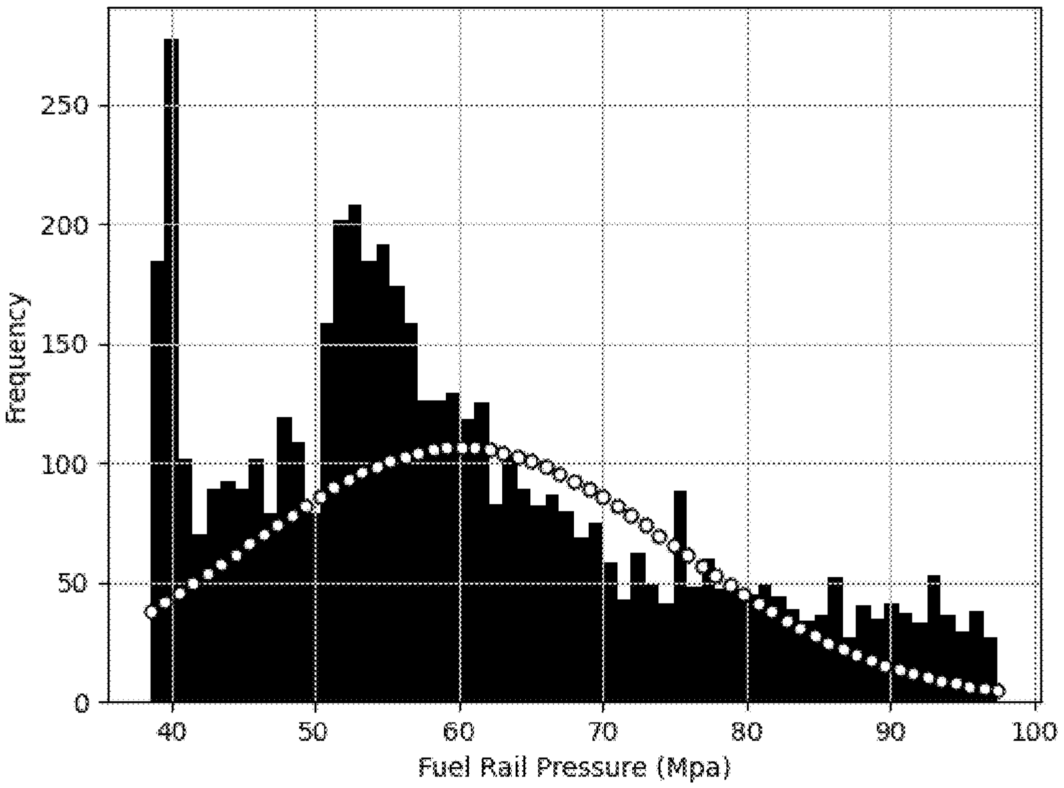
FIG. 4 shows a graph of an example of a bin of binned engine model data used to generate a statistical attribute model according to examples of the disclosure.

Referring to FIG. 4, FIG. 4 shows a graph of binned engine model data, as an example of binned engine data of one bin of the engine speed bins. For each value of fuel rail pressure (indicated in the x-axis), the processor 106 determines the corresponding frequency of occurrence of that value within the fuel rail pressure data for that bin (plotted on the y-axis) within the sampling time period. In FIG. 4, the frequency of occurrence is plotted as the black bars against fuel rail pressure every 1 MPa, although it will be appreciated that when analysing and processing the data, any suitable degree of precision could be used, for example depending on the fuel rail pressure values, and the desired degree of accuracy of the model.

At a step s340, the processor 106 generates, for each bin of the predetermined number of bins, statistical attribute model data based on the binned engine model data.

In some examples, the statistical attribute model data is generated by the processor 106 by fitting a normal Gaussian distribution to the binned engine model data for each bin to determine the mean value of frequency of occurrence of fuel rail pressure and standard deviation of the frequency of occurrence of the fuel rail pressure of the fuel rail pressure data in each bin. For example, FIG. 4 shows a Gaussian distribution (indicated as hollow circles "o") fitted to the frequency data for that bin. The statistical attribute model data may comprise mean value data indicative of the mean value and standard deviation data indicative of the standard deviation for each bin determined by fitting the Gaussian distribution to the binned engine test data.

In other examples, the statistical attribute model data is generated by the processor 106 by determining, for each bin, one or more percentile ranges of frequency of occurrence of fuel rail pressure of the fuel rail pressure data for the binned engine data.

At a step s350, the processor 106 generates the normal operation model based on the statistical attribute model data for each bin when taken together. It will be appreciated that the normal operation model could be generated from statistical model data generated from the fitted Gaussian distributions for each bin, from the percentile ranges for each bin, or a combination of both. It will also be appreciated that other statistical measures could be generated for each bin, and the normal operation model could be generated accordingly based on other appropriate statistical measures.

In some examples, the normal operation model comprises the mean value of frequency of occurrence of fuel rail pressure and standard deviation of the frequency of occurrence of the fuel rail pressure of the fuel rail pressure data for each bin, for example as shown in Table 1 below, where the prefix "M' indicates that the value "Mean" or "Sigma" (standard deviation) is associated with the engine model data:

TABLE 1

| Bin Number | Mean | Standard Deviation |
|---|---|---|
| 1 | M-Mean1 | M-Sigma1 |
| 2 | M-Mean2 | M-Sigma2 |
| 3 | M-Mean3 | M-Sigma3 |
| 4 | M-Mean4 | M-Sigma4 |
| 5 | M-Mean5 | M-Sigma5 |

At a step s360, the normal operation model is stored in the memory 108 for comparison with engine test data accumulated over a detection time period for enabling detection of an anomaly in an operational condition of the fuel rail based on comparison between the engine test data accumulated over the detection time period and the statistical attribute model data of the normal operation model.

In some examples, in order to help provide accuracy of the model, the method 300 may be performed for plurality of common rail internal combustion engines each having the same common attribute so as to generate a normal operation model for the plurality of common rail internal combustion engines. In other words, engine model data from a plurality of engines having common attributes may be aggregated together in order to generate the normal operation model. For example, a common attribute may be that all the engines of the plurality of engines have the same engine capacity (e.g. the same cubic capacity, cc). In other examples, a common attribute may be that all the engines of the plurality of engines have the rated power output (e.g. the same brake horse power, BHP). In some examples, engines of the plurality of engines used to generate the normal operation model may share more than one common attribute, such as all having the same cubic capacity and rated power output. However, it will be appreciated that other common attributes could be used.

As mentioned above, the engine model data may be filtered according to one or more criteria before storing in the memory 108, and thus excluded from the engine model data being used to generate normal operation model. This can help improve the accuracy of the normal operation model. FIG. 5 shows a flow chart of methods for filtering engine model data for use in generating the statistical attribute model data according to examples of the present disclosure.

Figure 5:
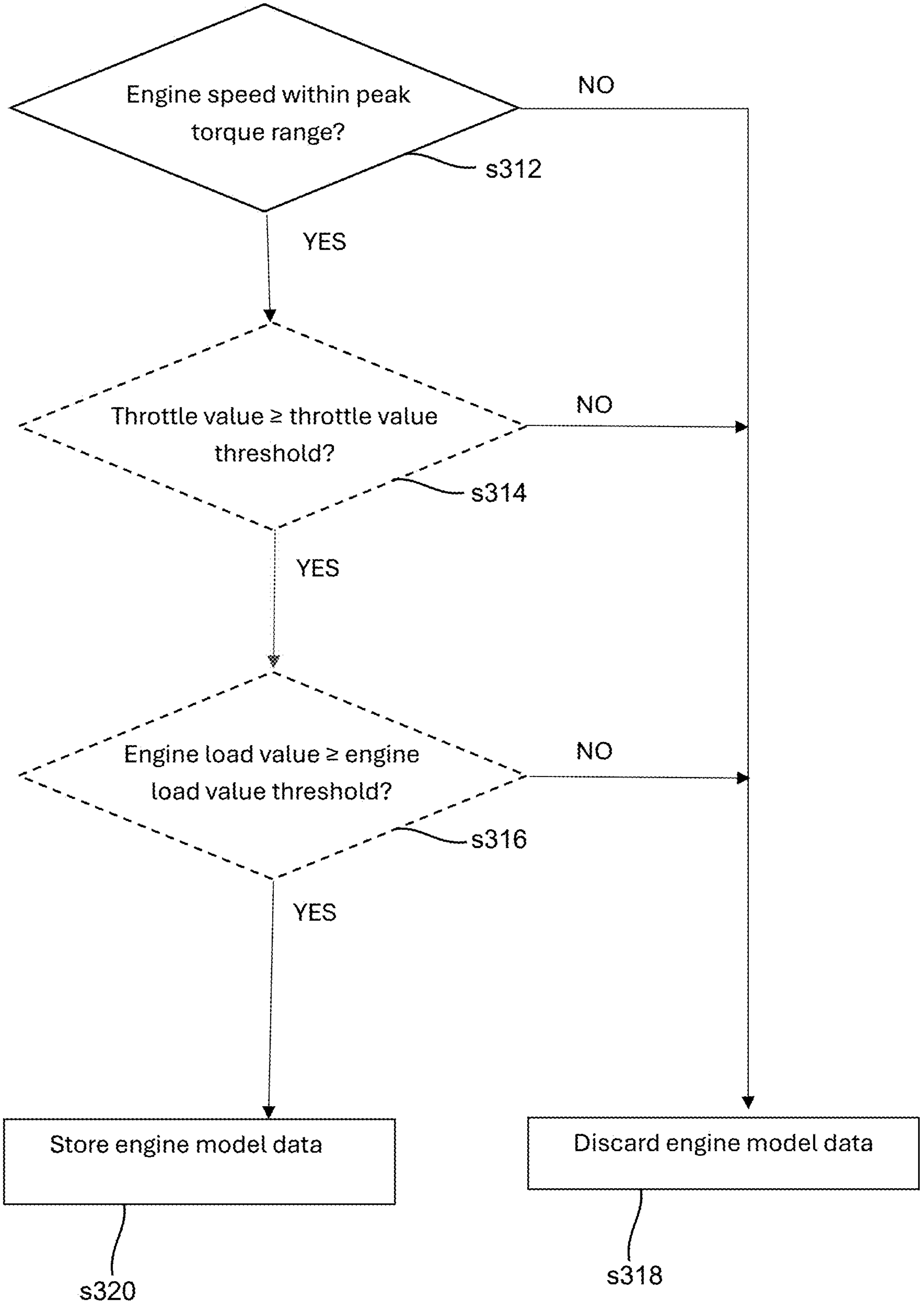
FIG. 5 shows a flow chart of methods for filtering engine model data for use in generating the statistical attribute model according to examples of the present disclosure.

The techniques of FIG. 5 may be implemented between the steps s310 and s320 described above as part of the method 300.

At a step s312, the processor determines if the engine speed, as indicated by the engine speed data, is within a predetermined peak torque range. If not, then, at a step s318, the associated engine model data is discarded. For example, fuel rail pressure values associated with engine speeds that are outside of the peak torque range may vary significantly, and thus not provide consistent data for generating the normal operation model.

The engine model data may comprise engine throttle data indicative of a throttle value of the engine, the engine throttle data being associated with the engine speed data. If, at the step s312, the engine speed is determined to be within the predetermined peak torque range, then at a step s314, the processor 106 determines if the throttle value of the engine throttle data is greater than or equal to a throttle value threshold. If not, then, at the step s318, the associated engine model data is discarded. For example, engine throttle values associated with low engine speeds may often occur outside the normal operation range of the engine, and thus not provide consistent data for generating the normal operation model.

The engine model data may comprise engine load data indicative of an engine load value of the engine, the engine load data being associated with the engine speed data. If, at the step s314, it is determined that the throttle value of the engine throttle data is greater than or equal to a throttle value threshold, then, at a step s316, the processor 106 determines if the engine load value of the engine load data is greater than or equal to a engine load value threshold. If not, then, at the step s318, the associated engine model data is discarded. For example, low engine load values may often occur when the vehicle is stationary and is idling, or when the vehicle is coasting down a hill, and thus not provide consistent data for generating the normal operation model.

If, at the step s318, it is determined that the engine load value of the engine load data is greater than or equal to the engine load value threshold, then, at the step s320, the engine model data is stored in the memory 108 in the same manner as that described above with respect to FIG. 3.

In some examples, the step s314, the step s316, or both may be omitted. It will also be appreciated that order of processing of the steps s312, s314, and s316 could be changed. For example, the step s316 could be carried out before the step s314. If a step is omitted and the criteria of that step is met, then processing proceeds to the next step, which may be storing the engine model data at the step s310 or another filtering step as appropriate.

The steps S312, s314, and s316 can therefore be thought of as filtering steps to help improve the accuracy of the normal operation model, and thus help reduce the likelihood of false alerts being generated when the normal operation model is used to detect anomalies in operation of the fuel rail of the engine.

The normal operation model may be used to determine if the common rail of the CR-ICE is operating correctly by comparing engine test data acquired from the engine during operation with that acquired for generating the normal operation model as will be described in more detail below.

Figure 3:
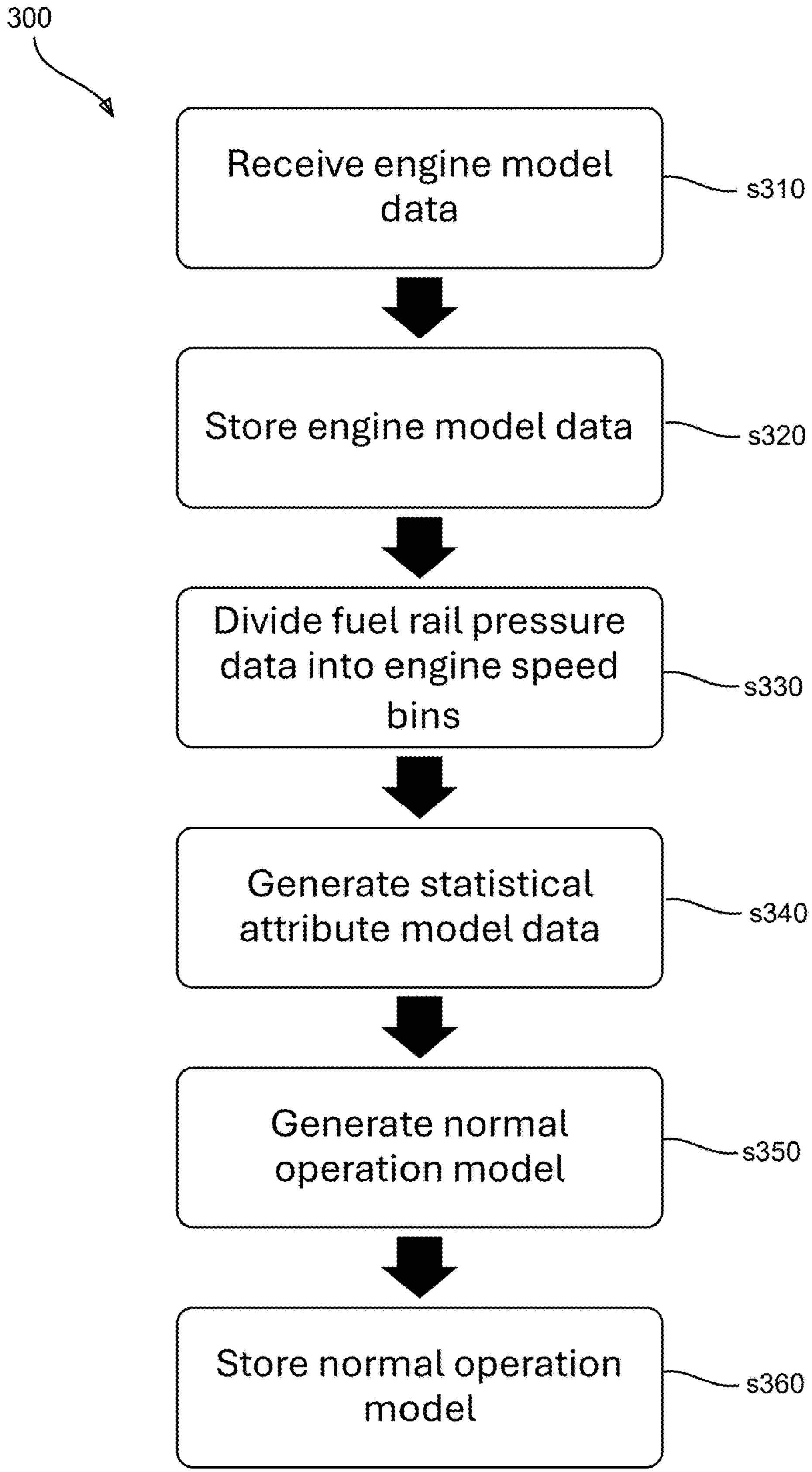
FIG. 3 shows a flowchart of a method for generating a normal operation model of a common rail internal combustion engine according to examples of the disclosure.

The normal operation model generated as described herein, for example with reference to FIGS. 3 to 5, may be used as a comparison for engine test data acquired during operation of the vehicle, for example during day-to-day operating conditions.

A method 400 for detecting an anomaly in an operational condition of a fuel rail of a common rail internal combustion engine based on comparison with a normal operation model generated will now be described with reference to FIGS. 6 to 9.

Figure 6:
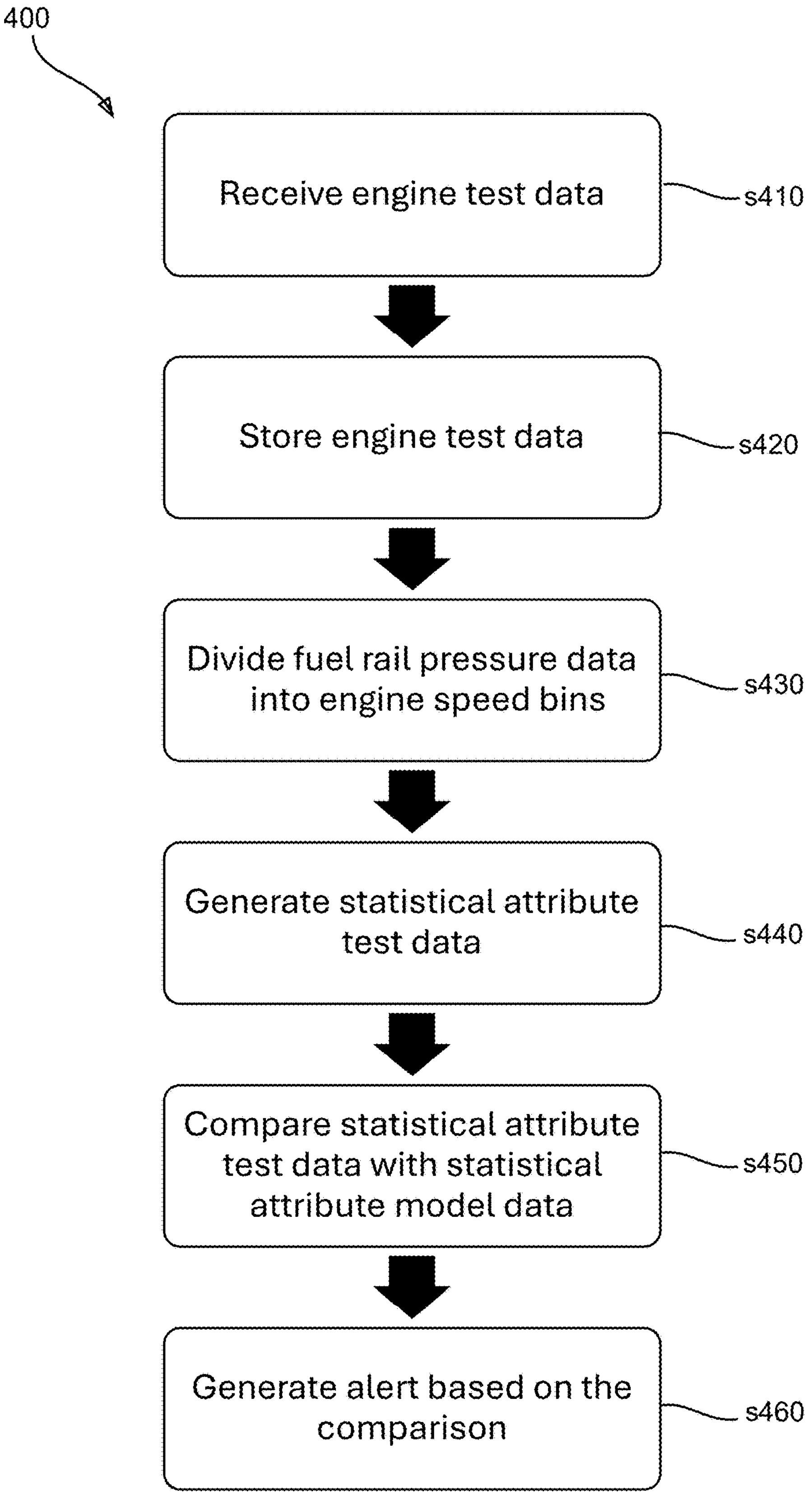
FIG. 6 shows a flow chart of a method for detecting an anomaly in an operational condition of a common rail internal combustion engine according to examples of the disclosure.

FIG. 6 shows a flow chart of a method for detecting an anomaly in an operational condition of a common rail internal combustion engine.

At a step s410, the computing system 102 receives engine test data obtained periodically during operation of the common rail internal combustion engine from an engine management system of the common rail internal combustion engine via the data interface 110. In a similar manner to generating the normal operation model, the engine test data may comprise fuel rail pressure data indicative of a fuel rail pressure of the fuel rail and engine speed data indicative of an engine speed of the engine. The engine test data may be obtained periodically during operation of the CR-ICE, for example based on OBD PID communication.

At a step S420, the engine test data is stored in the memory 108, and is accumulated over a detection time period. The detection time period may be chosen to correspond to the sampling time period used for generating the normal operation model, or may be different, for example chosen according to lag time to detect an anomaly, since the length of the detection time period determines how often anomaly detection can be performed. For example, detection of one or more anomalies may help predict if any engine fault codes might arise, before they actually occur, allowing any necessary remedial action to be taken sooner. Often, if the ECU of the engine generates a fault code, then there may already be a significant problem with the engine. Accordingly, the techniques described herein for detecting anomalies may help address this problem by providing a prediction such occurrences before they happen, meaning that remediating or pre-emptive actions to prevent significant problems may be able to be taken earlier.

A shorted detection time period may mean that deviations in operation fuel rail pressure from a normal situation may be determined more quickly, but the likelihood of false positives occurring may be increased. A longer detection time period may help reduce the likelihood of false positives, but increase the length of time between each determination of whether there is an anomaly in operational conditions of the fuel rail.

In some examples, the engine test data may be filtered according to one or more criteria before storing in the memory 108. This helps reduce the likelihood of spurious engine test data giving rise to false positives. The engine model data may also be filtered based on engine load and/or an engine throttle value, as will be described in more detail later below with reference to FIG. 8. However, it will be appreciated that other operational parameters of the engine could be used to filter the engine model data before storing, as appropriate. In some examples, the same filtering protocols as those used for generating the normal operation model may be used, although in other examples, different filtering protocols may be used, for example, depending on whether accuracy of detection is being prioritised or speed of detection.

In some examples, the processor 106 may remove a portion of the engine test data that lies within a fuel rail pressure threshold range from at least one of a lowest value of the fuel rail pressure data and a highest value of the fuel rail pressure data of the engine data, in a similar manner to that described above for generated the normal operation model. However, in order to help improve processing speed of the engine test data, in some examples, this portion removal processing may be omitted from the method 400.

At a step s430, the processor 106 divides the fuel rail pressure data into a predetermined number of engine speed bins during the detection time period so as to generate binned engine test data indicative of frequency of occurrence of fuel rail pressures within each bin. In examples, the predetermined number of bins corresponds to the same number of bins as those used for the normal operation model. In examples, the size of the predetermined bins may also be chosen to correspond to those used to generate the normal operation model. This helps enable comparison of the engine test data with the engine model data via appropriate statistical processing of the engine test data.

At a step s440, the processor 106 generates, for each bin of the predetermined number of bins, statistical attribute test data based on the binned engine test data.

In some examples, the statistical attribute test data is generated by the processor 106 by fitting a normal Gaussian distribution to the binned engine test data for each bin to determine the mean value of frequency of occurrence of fuel rail pressure and standard deviation of the frequency of occurrence of the fuel rail pressure of the fuel rail pressure data in each bin. The statistical attribute test data may comprise mean value data indicative of the mean value and standard deviation data indicative of the standard deviation for each bin determined by fitting the Gaussian distribution to the binned engine test data. An example of statistical attribute test data is shown below in table 2 where the prefix "T' indicates that the value "mean" or "Sigma" (standard deviation) is associated with the engine test data:

TABLE 2

| Bin Number | Mean | Standard Deviation |
|---|---|---|
| 1 | T-Mean1 | T-Sigma1 |
| 2 | T-Mean2 | T-Sigma2 |
| 3 | T-Mean3 | T-Sigma3 |
| 4 | T-Mean4 | T-Sigma4 |
| 5 | T-Mean5 | T-Sigma5 |

Figure 7:
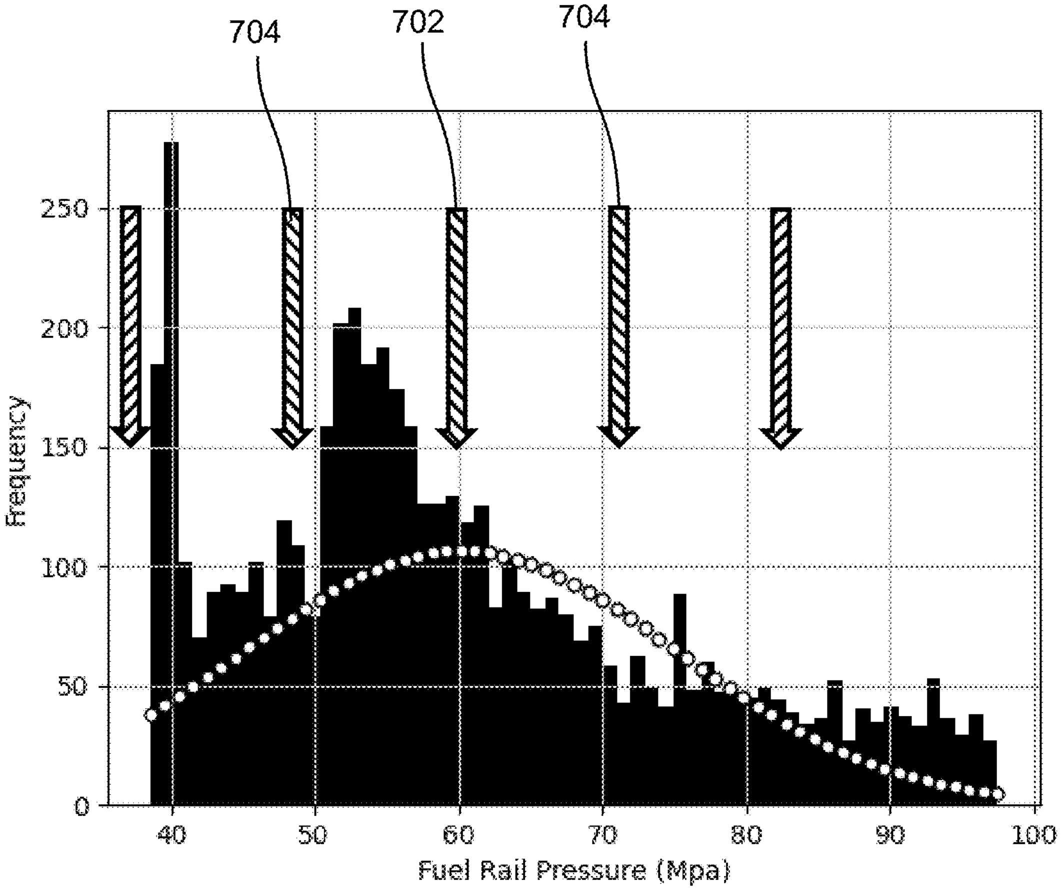
FIG. 7 shows a graph of an example of comparison of statistical attribute test data to the statistical attribute model data to enable detection of an anomaly in an operational condition of a common rail internal combustion engine according to examples of the disclosure.

At a step s450, the processor 106 compares, for each bin, the statistical attribute test data with the statistical attribute model data of the normal operation model. FIG. 7 shows a graph of an example of comparison of statistical attribute test data to the statistical attribute model data to enable detection of an anomaly in an operational condition of a common rail internal combustion engine. In particular, FIG. 7 shows the same binned data from FIG. 4 used to generate the statistical attribute model data for that bin. Referring to FIG. 7, a mean value 702 for a particular bin of test data (for example T-Mean1) corresponding to the same bin from the normal operation model, may be compared with the statistical attribute model data for that bin. For example, the value of T-Mean1 may be compared with the value of M-Mean1.

In other words, in some examples, comparing the statistical attribute test data with the statistical attribute model data of the normal operation model at the step s450 may comprise determining, by the processor 106 for each bin, the mean value of frequency of occurrence of fuel rail pressure from the fuel rail pressure data in each bin. The processor 106 may then compare the mean value of frequency of occurrence of the fuel rail pressure for each bin of the statistical attribute test data with the mean value of frequency of occurrence of the fuel rail pressure of the corresponding bin of the statistical attribute data from the normal operation model.

At a step s460, the processor 106 generates an alert based on if the comparison between the statistical attribute test data and the statistical attribute model data of the normal operation model over the detection time period meets a predetermined condition. For example, if the predetermined condition is met, then an alert can be generated indicating that there is an anomaly in the operation of the fuel rail, for example, too low a pressure, or too high a pressure. A user may thus be notified that remedial action might need to be taken, for example, to physically check the fuel injection system for leaks. Accordingly, problems with the fuel rail and fuel injection system are more likely to be detected earlier, and possible breakdown may be predicted and preemptive action taken.

It will be appreciated that several types of predetermined condition may be implemented depending on the conditions under which it may be desirable to generate an alert. One or more predetermined conditions may also be implemented in such a way as to help reduce the likelihood of false positives being generated (i.e. an alert being generated even if the fuel injection system is operating normally).

In some examples, the processor 106 may determine, for each bin, if an anomaly threshold difference between the mean value of frequency of occurrence of the fuel rail pressure statistical attribute test data for that bin and the mean value of frequency of occurrence fuel rail pressure of the corresponding bin of the statistical attribute model data from the normal operation model is greater than or equal to a threshold amount, and if so, flagging that bin.

For example, referring to Bin 1 of the statistical attribute test data, the processor 106 may determine whether T-Mean1-M-Mean1≥CThres, where CThres is the threshold amount. If so then Bin 1 would be flagged or otherwise labelled, for example as illustrated in Table 3 below:

TABLE 3

| Bin Number | | Flag |
|---|---|---|
| 1 | \|T-Mean1 − M-Mean1\| ≥ CThres? | TRUE |
| 2 | \|T-Mean2 − M-Mean2\| ≥ CThres? | FALSE |
| 3 | \|T-Mean3 − M-Mean3\| ≥ CThres? | TRUE |
| 4 | \|T-Mean4 − M-Mean4\| ≥ CThres? | TRUE |
| 5 | \|T-Mean5 − M-Mean5\| ≥ CThres? | FALSE |

In an example, the predetermined condition corresponds to the number of flagged bins being greater than or equal to an anomaly threshold number, AnThres. The anomaly threshold number may be selected to be any number between 1 and the total number of bins. A lower anomaly threshold number will mean that the detection method and system is more sensitive and the likelihood of an alert being generated is higher, whereas a higher anomaly threshold number will mean that the detection method and system is less sensitive but reduce the likelihood of false positives.

Referring to Table 3, for example, if the anomaly threshold number is 2, then the predetermined condition would be met, and an alert generated. However, if the anomaly threshold number if 4, then the predetermined condition would not be met, and an alert would not be generated.

While in the examples above, the mean values are compared between the statistical attribute model data and the statistical attribute test data, it will be appreciated that other comparisons may be considered. For example, the standard deviation of the statistical attribute test data of each bin may be compared with the corresponding standard deviation of the statistical attribute model data and if the difference is greater than or equal to a standard deviation threshold, then that bin may be flagged in a similar manner to that described above with respect to the mean. For example, referring to FIG. 7, the value of the standard deviation (indicated by the arrows 704) of the statical attribute test data for that bin may be compared with the value of the standard deviation of the statistical attribute model data derived from the Gaussian fit (shown as the open circles "o" in FIG. 7). If, for example, the number of flagged bins based on the comparison of the respective standard deviations for each bin exceeds a threshold (e.g. a standard deviation anomaly threshold, SDThres), then the predetermined condition may be considered to be met, and an alert generated.

In some circumstances, it may be useful to determine if the common rail is operating generally under pressure or generally over pressure, because, as mentioned above, over or under pressure may cause different issues regarding emissions or engine operation/efficiency. Therefore, in some examples, generating the alert comprises generating a high pressure alert if the difference between the mean frequency of occurrence of the statistical attribute detection data and the mean frequency of occurrence of the corresponding bin of the statistical attribute data from the normal operation model of the flagged bins is positive, generating a low pressure alert if the difference between the mean frequency of occurrence of the statistical attribute detection data and the mean frequency of occurrence of the corresponding bin of the statistical attribute data from the normal operation model of the flagged bins is negative.

In some examples, flag data indicative of a status of the flag (e.g. TRUE or FALSE as shown for example in Table 3) comprises associated sign data indicative of whether the difference between values of the statistical attribute test data and values of the statistical attribute model data is positive of negative.

For example, if the difference between the mean frequency of occurrence of the statistical attribute detection data and the mean frequency of occurrence of the corresponding bin of the statistical attribute data from the normal operation model of the flagged bins is positive, then that bin may be flagged as positive, e.g. "TRUE+".

If, for example, the difference between the mean frequency of occurrence of the statistical attribute detection data and the mean frequency of occurrence of the corresponding bin of the statistical attribute data from the normal operation model of the flagged bins is negative, then that bin may be flagged as negative e.g. "TRUE-". Aggregation logic based on the number of positively or negatively flagged bins may be applied in a similar manner to that described above with respect to the anomaly threshold number.

For example, a first anomaly threshold number may be implemented for the high pressure alert and considered as "AnThres+", and a second anomaly threshold number may be implemented for the low pressure alert and considered as "AnThres-". The first anomaly threshold number and the second anomaly threshold number may be the same as each, or they may be different.

Figure 8:
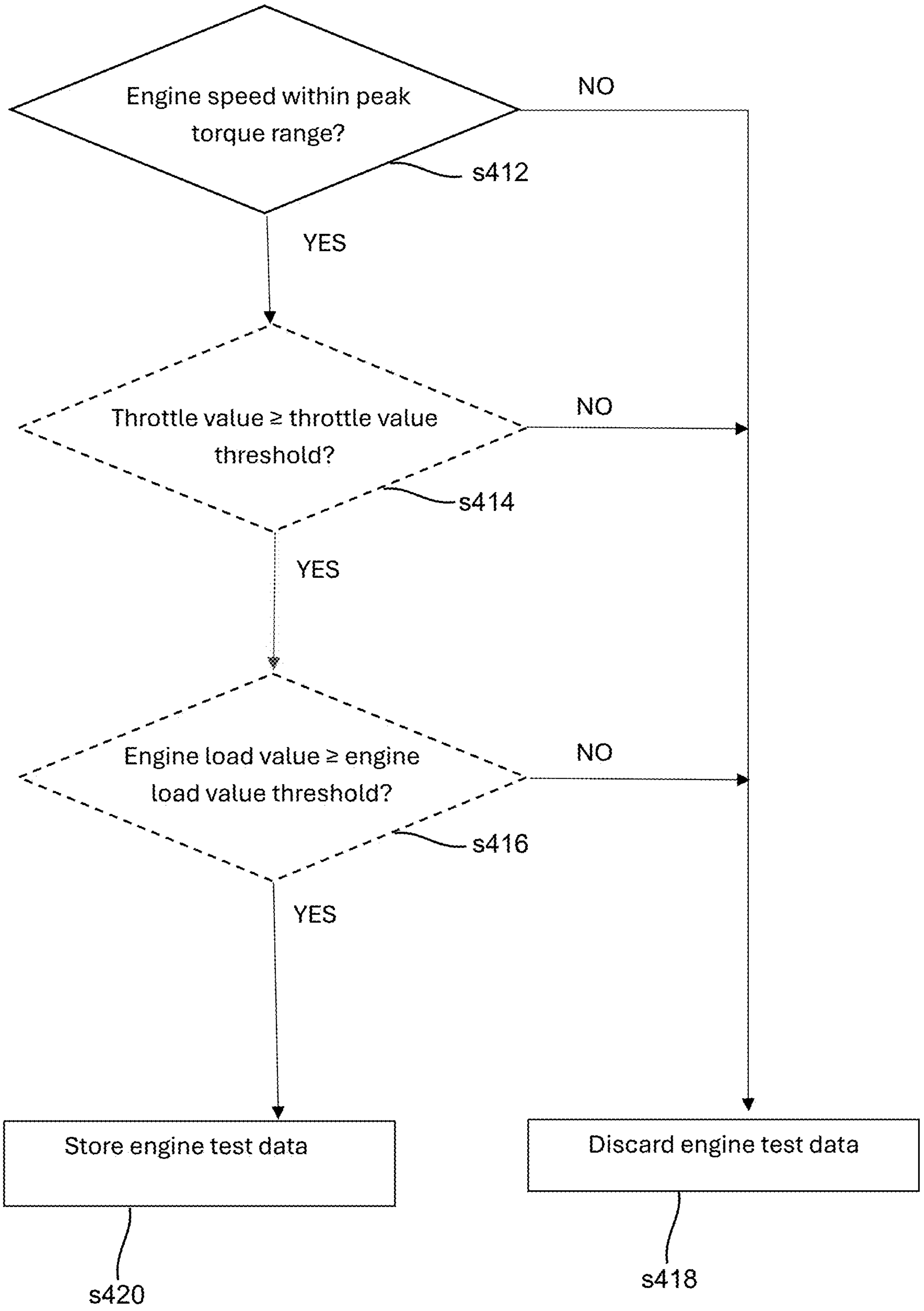
FIG. 8 shows a flow chart of methods for filtering engine test data for use in detecting an anomaly in an operational condition of a common rail internal combustion engine according to examples of the present disclosure.

In some implementations, in order to help reduce the likelihood of false positives when generating an alert or alerts, the engine test data may be filtered, for example in a similar manner to that described above with respect to FIG. 5. FIG. 8 shows a flow chart of methods for filtering engine test data for use in detecting an anomaly in an operational condition of a common rail internal combustion engine.

The techniques of FIG. 8 may be implemented between the steps s410 and s420 described above as part of the method 400.

At a step s412, the processor determines if the engine speed, as indicated by the engine speed data, is within a predetermined peak torque range. If not, then, at a step s418, the associated engine test data is discarded. For example, fuel rail pressure values associated with engine speeds that are outside of the peak torque range may vary significantly, and thus not provide consistent data for generating the normal operation model.

The engine test data may comprise engine throttle data indicative of a throttle value of the engine, the engine throttle data being associated with the engine speed data. If, at the step s412, the engine speed is determined to be within the predetermined peak torque range, then at a step s414, the processor 106 determines if the throttle value of the engine throttle data is greater than or equal to a throttle value threshold. If not, then, at the step s418, the associated engine test data is discarded. For example, engine throttle values associated with low engine speeds may give rise to anomalous fuel rail pressures that are not actually indicative of a problem with the fuel rail or fuel injection system, and thus their inclusion may increase the chances incorrectly generating an alert.

The engine test data may comprise engine load data indicative of an engine load value of the engine, the engine load data being associated with the engine speed data. If, at the step s414, it is determined that the throttle value of the engine throttle data is greater than or equal to a throttle value threshold, then, at a step s416, the processor 106 determines if the engine load value of the engine load data is greater than or equal to a engine load value threshold. If not, then, at the step s418, the associated engine test data is discarded. For example, low engine load values may often occur when the vehicle is stationary and is idling, or when the vehicle is coasting down a hill, and thus not be useful for determining if the fuel rail or fuel injection system is operating correctly.

If, at the step s418, it is determined that the engine load value of the engine load data is greater than or equal to the engine load value threshold, then, at the step s420, the engine test data is stored in the memory 108 in the same manner as that described above with respect to FIG. 6.

In some examples, the step s414, the step s416, or both may be omitted. It will also be appreciated that order of processing of the steps s412, s414, and s416 could be changed. For example, the step s416 could be carried out before the step s414. If a step is omitted and the criteria of that step is met, then processing proceeds to the next step, which may be storing the engine model data at the step s410 or another filtering step as appropriate.

The steps S412, s414, and s416 can therefore be thought of as filtering steps to help reduce the likelihood of false alerts being generated when the statistical attribute data is compared with that of the normal operation model to detect anomalies in operation of the fuel rail of the engine.

As mentioned above, in examples, the detection of an anomaly may be performed in respect of a detection time period, and an alert generated accordingly. In examples, the detection of an anomaly may be performed every detection time period, and the detection time periods may be considered sequentially. However, depending on the length of the detection time period, this may result in an alert being switched on and off relatively frequently within a short period of time. For example, if the detection time period is 10 minutes, then an alert could change between being "on" and "off" on the time scale of 10 minutes, which may not fully reflect the operating conditions of the fuel rail of the engine, as well as potentially overwhelming a user with alerts. Accordingly, in some examples, aggregation logic is applied to the generation of alerts in order to help reduce the how often the alert transitions between on and off, while helping to improve the chances a problem with the fuel rail can still be predicted accurately.

Figure 9A:
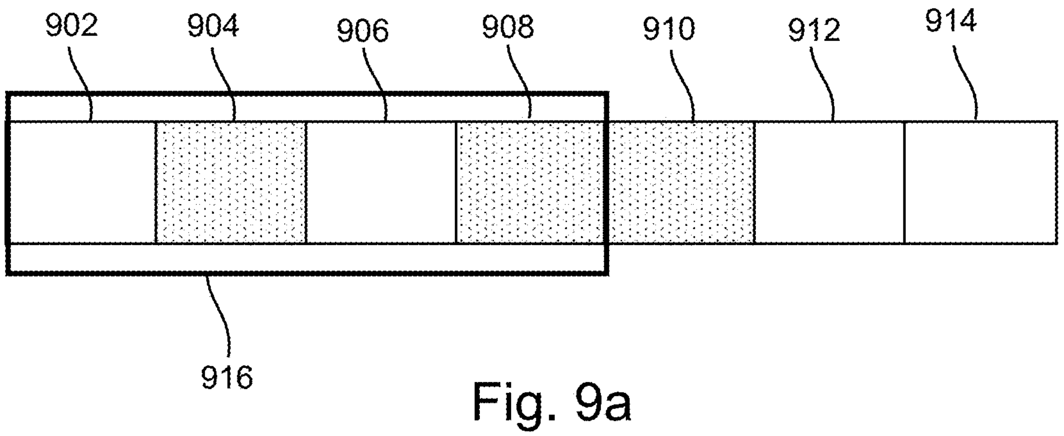
FIGS. 9*a*, 9*b*, and 9*c* schematically illustrate the application of aggregation logic to generating an alert according to examples of the present disclosure.
Figure 9B:
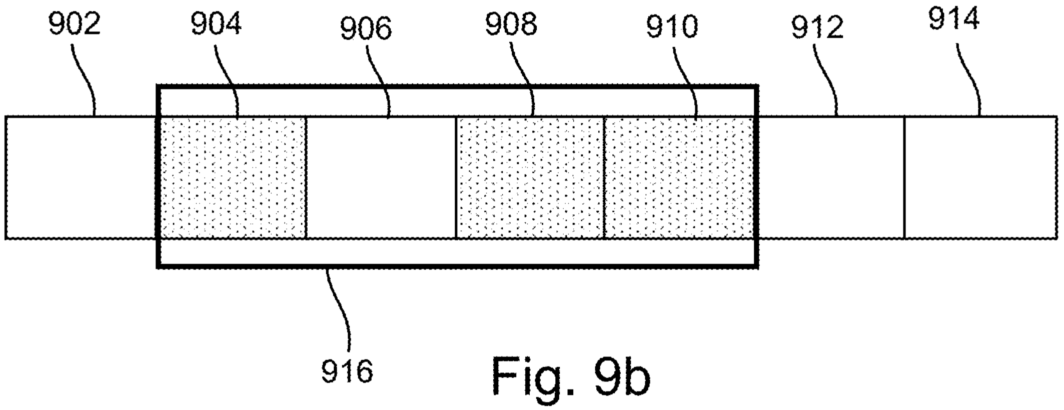
Figure 9C:
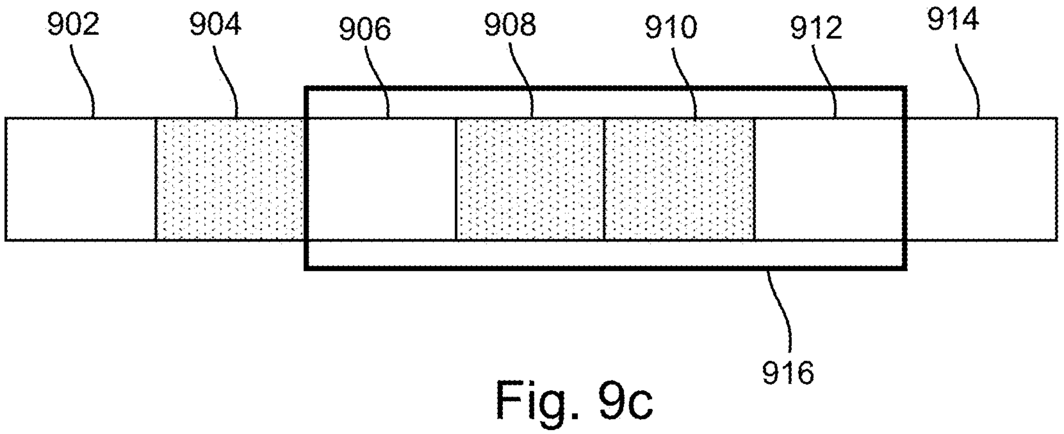

FIGS. 9*a*, 9*b*, and 9*c* schematically illustrate the application of aggregation logic to generating an alert according to examples of the present disclosure. As mentioned above, the method 400 may be carried out every detection time period sequentially. In other words, for example, once one detection time period ends, the method 400 may be implemented again in respect of a next detection time period.

FIGS. 9*a*, 9*b*, and 9*c* schematically show a first detection time period 902, a second detection time period 904, a third detection time period 906, a fourth detection time period 908, a fifth detection time period 910, a sixth detection time period 912, and a seventh detection time period 914 arranged sequentially. In examples, generating the alert may be based on a windowed time period 916 comprising a sequence of the detection time periods, such as the detection time periods 902-914. The windowed time period may be controlled by the processor 106 to move over time with respect to the detection time periods of the sequence of detection time periods.

For example, FIG. 9*a* shows the windowed time period 916 at a period in time overlapping the detection time periods 902-908, FIG. 9*b* shows the windowed time period 916 at a period in time overlapping the detection time periods 904-910, and FIG. 9*c* shows the windowed time period 916 at a period in time overlapping the detection time periods 906-912. Another way of considering this is, for example, that the windowed time period corresponds to a time period coinciding with an integer number of detection time periods, and that the detection time periods of the sequence of detection time periods are considered to move relative to the windowed time period.

In examples, generating the alert comprises turning on the alert if a number of detection time periods for which the predetermined condition is met within the windowed time period is greater than or equal to a first threshold number.

In some examples, generating the alert comprises turning off the alert if a number of detection time periods for which the predetermined condition is not met within the windowed time period is greater than or equal to a second threshold number.

The first threshold number may be different from the second threshold number, although it will be appreciated that they could be the same as each other.

For example, referring to FIGS. 9*a* to 9*c*, detection time periods determined as meeting the predetermined condition are shaded with dots, i.e. detection time periods 904, 908, and 910. In an example, the first threshold number may be 3, and the second threshold number may be 2, although it will be appreciated that any suitable numbers could be chosen, for example based on the detection time period, the length of the windowed time period, and the desired frequency at which alerts may be generated.

Starting from the position of the windowed time period 916 with respect to the sequence of detection time periods in the example of FIG. 9*a*, the windowed time period comprises two detection time periods for which the predetermined condition is met. Therefore, for the example of FIG. 9*a*, the alert would not be turned on.

In the example of FIGS. 9*a*-9*c*, once the windowed time period 916 corresponds to the time period covering the detection time periods 904-910 (FIG. 9*b*), the number of detection time periods for which the predetermined condition is satisfied equals the first threshold number, and therefore the alert would be turned on.

When the windowed time period 916 corresponds to the time period covering the detection time periods 906-912 (FIG. 9*c*), the number of detection time periods for which the predetermined condition is satisfied equals the second threshold number, and therefore the alert would be turned off. However, if the second threshold number was 3 or more, then in the situation shown in FIG. 9*c*, the alert would not be turned off until the number of detection time periods within the windowed time period which satisfy the predetermined condition becomes greater than or equal to the second threshold number. Accordingly, churn between the alert being on and the alert being off can be reduced, thus helping to facilitate better indication of whether there is an issue or not with the fuel injection system, as well as helping reduce data that might need to be sent to a service center based on the alerts.

Figure 10:
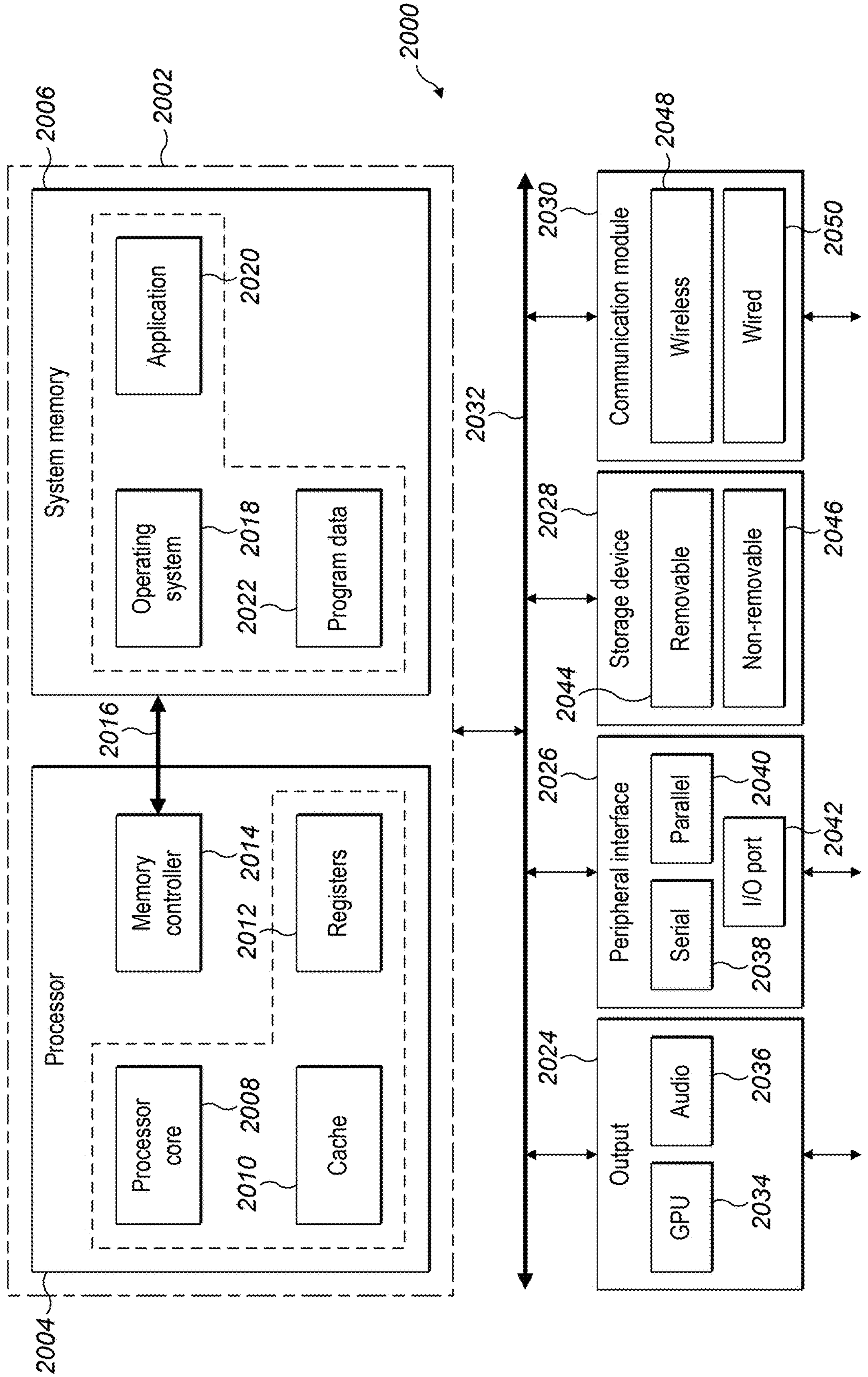
FIG. 10 schematically shows a computer system for implementing methods of examples of the disclosure.

FIG. 10 schematically shows a computer system for implementing methods of examples of the disclosure. In particular, FIG. 10 shows an example of a computing device 2000 for example which may be arranged to implement one or more of the examples of the methods described herein. In examples, the computing device 2000 comprises main unit 2002. The main unit 2002 may comprise a processor 2004 and a system memory 2006. In examples, the processor 2004 may comprise a processor core 2008, a cache 2010, and one or more registers 2012. In examples, the processor core 2008 may comprise one or more processing cores and may comprise a plurality of cores which may run a plurality of threads. The processor 2004 may be of any suitable type such as microcontroller, microprocessor, digital signal processor or a combination of these, although it will be appreciated that other types of processor may be used.

In examples, the processor core 2008 may comprise one or more processing units. In examples, the processor core 2008 comprises one or more of a floating point unit, an arithmetic unit, a digital signal processing unit, or a combination of these and/or plurality of other processing units, although it will be appreciated that other processing units could be used. In examples, the cache 2010 may comprise a plurality of caches such as a level one cache and a level two cache, although other appropriate cache arrangements could be used.

In examples, the processor 2004 comprises a memory controller 2014 operable to allow communication between the processor 2004 and the system memory 2006 via a memory bus 2016. The memory controller 2014 may be implemented as an integral part of the processor 2004, or it may be implemented as separate component.

In examples, the system memory 2006 may be of any suitable type such as non-volatile memory (e.g. flash memory or read only memory), volatile memory (such as random access memory (RAM)), and/or a combination of volatile and non-volatile memory. In examples, the system memory 2006 may be arranged to store code for execution by the processor 2004 and/or data related to the execution. For example, the system memory may store operating system code 2018, application code 2020, and program data 2022. In examples, the application code 2020 may comprise code to implement one or more of the example methods described herein, for example to implement the steps described above with reference to FIGS. 3, 5, 7, and 8 The application code 2020 may be arranged to cooperate with the program data 2022 or other media, for example to provide the functionality described herein.

In examples, the computing device 2000 may have additional features, functionality or interfaces. For example main unit 2002 may cooperate with one or more peripheral devices for example to implement the methods described herein. In examples, the computing device 2000 comprises, as peripheral devices, an output interface 2024, a peripheral interface 2026, a storage device 208, and a communication module 2030. In examples, the computing device comprises an interface bus 2032 arranged to facilitate communication between the main unit 2002 and the peripheral devices.

In examples, the output device 2024 may comprise output devices such as a graphical processing unit (GPU) 2034 and audio output unit 2036 for example arranged to be able to communicate with external devices such as a display, and/or loudspeaker, via one or more suitable ports such as audio/video (A/V) port. In examples, the peripheral interface 2026 may comprise a serial interface 2038, a parallel interface 2040, and a input/output port(s) 2042 which may be operable to cooperate with the main unit 2002 to allow communication with one or more external input and/or output devices via the I/O port 2042. For example, the I/O port 2042 may communication with one or more input devices such as a keyboard, mouse, touch pad, voice input device, scanner, imaging capturing device, video camera, and the like, and/or with one or more output devices such as a 2D printer (e.g. paper printer), or 3D printer, or other suitable output device. For example, engine model data and/or engine test data may be received via the I/O port 2042 and/or the communication module 2030.

In examples, the storage device may comprise removable storage media 2044 and/or non-removable storage media 2046. For example, the removable storage media may be random access memory (RAM), electrically erasable programmable read only memory (EEPROM), read only memory (ROM) flash memory, or other memory technology, optical storage media such as compact disc (CD) digital versatile disc (DVD) or other optical storage media, magnetic storage media such as floppy disc, magnetic tape, or other magnetic storage media. However, it will be appreciated that any suitable type of removable storage media could be used. Non-removable storage media 2046 may comprise a magnetic storage media such as a hard disk drive, or solid state hard drive, or other suitable media, although it will be appreciated that any suitable non-removable storage media could be used. The storage device 2028 may allow access by the main unit 2002 for example to implement the methods described herein.

In examples, the communication module may comprise a wireless communication module 2048 and a wired communication module 2050. For example, the wireless communication module may be arranged to communicate wirelessly via a suitable wireless communication standard for example relating to wifi, Bluetooth, near field communication, optical communication (such as infrared), acoustic communication, or via a suitable mobile telecommunications standard. The wired communication module may allow communication via a wired or optical link for example by Ethernet or optical cable. However, it will be appreciated that any suitable communication module could be used. For example, the communication module may implement the functionality of the data interface 110 described herein.

Referring to FIG. 1, the system 102 may be used to implement the methods 300 or 400 described herein, and the system 102 may for example be implemented by the computing device 2000.

It will be appreciated that in examples of the disclosure, elements of the disclosed methods may be implemented in a computing device (such as the computing device described above with reference to FIG. 10) in any suitable manner. For example, a conventional computing device may be adapted to perform one or more of the methods described herein by programming/adapting one or more processors of the computing device. As such, in examples, the programming/adapting may be implemented in the form of a computer program product comprising computer implementable instructions stored on a data carrier and/or carried by a signal bearing medium, such as floppy disk, hard disk, optical disk, solid state drive, flash memory, programmable read only memory (PROM), random access memory (RAM), or any combination of these or other storage media or signal bearing medium, or transmitted via a network such as a wireless network, Ethernet, the internet, or any other combination of these or other networks.

In other words, in examples, a computer program may comprise computer readable instructions which, when implemented on a computing device, cause the computing device to carry out a method according examples of the disclosure. In examples, a storage medium may comprise the computer program, for example, as mentioned above. It will also be appreciated that other suitable computer architectures could be used such as those based on one or more parallel processors. Furthermore, at least some processing may be implemented on one or more graphical processing units (GPUs). Although computing device 2000 is described as a general purpose computing device, it will be appreciated that this could be implemented in any appropriate device, such as mobile phone, smart phone, camera, video camera, tablet device, server device, one or more distributed computing (e.g. cloud computing) devices with modifications and/or adaptation if appropriate to the features described above, for example dependent on the desired functionality and hardware features.

Further features and examples are defined in the following numbered clauses.

1. A method for generating a normal operation model indicative of a normal operational condition of a fuel rail of a common rail internal combustion engine, the method comprising:

receiving, from an engine management system of the common rail internal combustion engine via a data interface, engine model data obtained periodically during operation of the common rail internal combustion engine, the engine model data comprising fuel rail pressure data indicative of a fuel rail pressure of the fuel rail and engine speed data indicative of an engine speed of the engine;

storing the engine model data in a memory, the engine model data being accumulated over a sampling time period;

dividing, by a processor, the fuel rail pressure data into a predetermined number of engine speed bins derived from the engine speed data during the sampling time period so as to generate binned engine model data indicative of frequency of occurrence of fuel rail pressures within each bin;

generating, by the processor for each bin of the predetermined number of bins, statistical attribute model data based on the binned engine model data;

generating, by the processor, the normal operation model based on the statistical attribute model data for each bin when taken together; and storing, in the memory, the normal operation model for comparison with engine test data accumulated over a detection time period for enabling detection of an anomaly in an operational condition of the fuel rail based on comparison between the engine test data accumulated over the detection time period and the statistical attribute model data of the normal operation model.

2. A method according to clause 1, comprising determining, by the processor, if the engine speed of the engine speed data is within a predetermined peak torque range, and if not, discarding the associated engine model data.

3. A method according to clause 2, in which:

the engine model data comprises engine throttle data indicative of a throttle value of the engine, the engine throttle data being associated with the engine speed data, and the method comprises determining, by the processor, if the throttle value of the engine throttle data is greater than or equal to a throttle value threshold, and if not, discarding the associated engine model data.

4. A method according to clause 2 or clause 3, in which: the engine model data comprises engine load data indicative of an engine load value of the engine, the engine load data being associated with the engine speed data, and
the method comprises determining, by the processor, if the engine load value of the engine load data is greater than or equal to a engine load value threshold, and if not, discarding the associated engine model data.

5. A method according to any preceding clause, comprising removing, by the processor, before dividing the fuel rail pressure data into the predetermined number of bins, a portion of the engine model data that lies within a fuel rail pressure outlier threshold range from at least one of a lowest value of the fuel rail pressure data and a highest value of the fuel rail pressure data of the engine model data.

6. A method according to any preceding clause, in which generating the statistical attribute model data comprises fitting a normal Gaussian distribution to the binned engine model data for each bin to determine the mean value of frequency of occurrence of fuel rail pressure and standard deviation of the frequency of occurrence of the fuel rail pressure of the fuel rail pressure data in each bin.

7. A method according to any preceding clause, in which generating the statistical attribute data comprises determining, for each bin, one or more percentile ranges of frequency of occurrence of fuel rail pressure of the fuel rail pressure data for the binned engine data.

8. A method according to any preceding clause, comprising performing the method for a plurality of common rail internal combustion engines each having the same common attribute so as to generate a normal operation model for the plurality of common rail internal combustion engines.

9. A method for detecting an anomaly in an operational condition of a fuel rail of a common rail internal combustion engine based on comparison with a normal operation model generated according to any preceding clause, the method comprising:
receiving, from an engine management system of the common rail internal combustion engine via a data interface, engine test data obtained periodically during operation of the common rail internal combustion engine, the engine test data comprising fuel rail pressure data indicative of a fuel rail pressure of the fuel rail and engine speed data indicative of an engine speed of the engine;
storing the engine test data in a memory, the engine test data being accumulated over a detection time period;
dividing, by a processor, the fuel rail pressure data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;
generating, by the processor for each bin of the predetermined number of bins, statistical attribute test data based on the binned engine test data;
comparing, by the processor for each bin, the statistical attribute test data with the statistical attribute model data of the normal operation model; and
generating, by the processor, an alert based on if the comparison between the statistical attribute test data and the statistical attribute model data of the normal operation model over the detection time period meets a predetermined condition.

10. A method according to clause 9, comprising determining, by the processor, if the engine speed data is within a predetermined peak torque range, and if not, discarding the associated engine test data.

11. A method according to clause 10, in which:
the engine test data comprises engine throttle data indicative of a throttle value of the engine, the engine throttle data being associated with the engine speed data, and the method comprises determining, by the processor, if the throttle value of the engine throttle data is greater than or equal to a throttle value threshold, and if not, discarding the associated engine test data.

12. A method according to clause 10 or clause 11, in which:
the engine test data comprises engine load data indicative of an engine load value of the engine, the engine load data being associated with the engine speed data, and
the method comprises determining, by the processor, if the engine load value of the engine load data is greater than or equal to a engine load value threshold, and if not, discarding the associated engine test data.

13. A method according to any of clauses 9 to 12, in which comparing the statistical attribute test data with the statistical attribute model data of the normal operation model comprises:
determining, by the processor for each bin, the mean value of frequency of occurrence of fuel rail pressure from the fuel rail pressure data in each bin; and
comparing the mean value of frequency of occurrence of the fuel rail pressure for each bin of the statistical attribute test data with the mean value of frequency of occurrence of the fuel rail pressure of the corresponding bin of the statistical attribute data from the normal operation model.

14. A method according to clause 13, comprising determining, by the processor, for each bin, if an anomaly threshold difference between the mean value of frequency of occurrence of the fuel rail pressure statistical attribute test data for that bin and the mean value of frequency of occurrence fuel rail pressure of the corresponding bin of the statistical attribute model data from the normal operation model is greater than or equal to a threshold amount, and if so, flagging that bin 15. A method according to clause 14, in which the predetermined condition corresponds to the number of flagged bins being greater than or equal to an anomaly threshold number.

16. A method according to clause 15, in which generating the alert comprises:
generating a high pressure alert if the difference between the mean frequency of occurrence of the statistical attribute detection data and the mean frequency of occurrence of the corresponding bin of the statistical attribute data from the normal operation model of the flagged bins is positive; and
generating a low pressure alert if the difference between the mean frequency of occurrence of the statistical attribute detection data and the mean frequency of occurrence of the corresponding bin of the statistical attribute data from the normal operation model of the flagged bins is negative.

17. A method according to any of clauses 9 to 16, in which:

the method is carried out every detection time period sequentially;

generating the alert is based on a windowed time period comprising a sequence of the detection time periods, the windowed time period moving over time with respect to the detection time periods of the sequence of detection time periods; and generating the alert comprises turning on the alert if a number of detection time periods for which the predetermined condition is met within the windowed time period is greater than or equal to a first threshold number.

18. A method according to clause 17, in which:

generating the alert comprises turning off the alert if a number of detection time periods for which the predetermined condition is not met within the windowed time period is greater than or equal to a second threshold number.

19. A method for detecting an anomaly in an operational condition of a fuel rail of a common rail internal combustion engine based on comparison with a normal operation model, the normal operation model comprising statistical attribute model data previously generated from binned engine model data of the common rail internal combustion engine operating under normal operational conditions, in which the binned engine model data has been generated by dividing fuel rail pressure data of engine model data obtained from the common rail internal combustion engine into a predetermined number of engine speed bins, the engine model data comprises fuel rail pressure model data indicative of a fuel rail pressure of the fuel rail and engine speed model data indicative of an engine speed of the engine, the predetermined number of engine speed bins are derived from the engine speed data during a sampling time period, and the binned engine model data is indicative of frequency of occurrence of fuel rail pressures within each bin, the method comprising:

receiving, from an engine management system of the common rail internal combustion engine via a data interface, engine test data obtained periodically during operation of the common rail internal combustion engine, the engine test data comprising fuel rail pressure test data indicative of a fuel rail pressure of the fuel rail and engine speed test data indicative of an engine speed of the engine;

storing the engine test data in a memory, the engine test data being accumulated over a detection time period;

dividing, by a processor, the fuel rail pressure test data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;

generating, by the processor for each bin of the predetermined number of bins, statistical attribute test data based on the binned engine data;

comparing, by the processor for each bin, the statistical attribute test data with the statistical attribute model data of the normal operation model; and generating, by the processor, an alert based on if the comparison between the statistical attribute test data and the statistical attribute model data of the normal operation model over the detection time period meets a predetermined condition.

20. A method according to any preceding clause in which the common rail internal combustion engine is a diesel engine.

21. A computer program comprising instructions which, when executed by a computer, cause the computer to carry out the method of any of clauses 1 to 8.

22. A non-transitory tangible computer-readable media having stored thereon a computer program according to clause 21.

23. A computer program comprising instructions which, when executed by a computer, cause the computer to carry out the method of any of clauses 9 to 18.

24. A non-transitory tangible computer-readable media having stored thereon a computer program according to clause 23.

25. A computer program comprising instructions which, when executed by a computer, cause the computer to carry out the method of clause 19.

26. A non-transitory tangible computer-readable media having stored thereon a computer program according to clause 25.

27. A model generating system for generating a normal operation model indicative of a normal operational condition of a fuel rail of a common rail internal combustion engine, the system comprising:

a data interface configured to receive, from an engine management system of the common rail internal combustion engine, engine model data obtained periodically during operation of the common rail internal combustion engine, the engine model data comprising fuel rail pressure data indicative of a fuel rail pressure of the fuel rail and engine speed data indicative of an engine speed of the engine;

a memory configured to store the engine model data, the engine model data being accumulated over a sampling time period; and a processor configured to:

divide the fuel rail pressure data into a predetermined number of engine speed bins derived from the engine speed data during the sampling time period so as to generate binned engine model data indicative of frequency of occurrence of fuel rail pressures within each bin; generate, for each bin of the predetermined number of bins, statistical attribute model data based on the binned engine model data; and generate the normal operation model based on the statistical attribute model data for each bin when taken together, in which the memory is configured to store the normal operation model for comparison with engine test data accumulated over a detection time period for enabling detection of an anomaly in an operational condition of the fuel rail based on comparison between the engine test data accumulated over the detection time period and the statistical attribute model data of the normal operation model.

28. A detection system for detecting an anomaly in an operational condition of a fuel rail of a common rail internal combustion engine based on comparison with a normal operation model generated using the system of clause 27, the detection system comprising:

a data interface configured to receive, from an engine management system of the common rail internal combustion engine, engine test data obtained periodically during operation of the common rail internal combustion engine, the engine test data comprising fuel rail pressure data indicative of a fuel rail pressure of the fuel rail and engine speed data indicative of an engine speed of the engine;

a memory configured to store the engine test data, the engine test data being accumulated over a detection time period; and a processor configured to:

divide the fuel rail pressure data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;

generate, for each bin of the predetermined number of bins, statistical attribute test data based on the binned engine test data;

compare, for each bin, the statistical attribute test data with the statistical attribute model data of the normal operation model; and generate an alert based on if the comparison between the statistical attribute test data and the statistical attribute model data of the normal operation model over the detection time period meets a predetermined condition.

29. A detection system for detecting an anomaly in an operational condition of a fuel rail of a common rail internal combustion engine based on comparison with a normal operation model, the normal operation model comprising statistical attribute model data previously generated from binned engine model data of the common rail internal combustion engine operating under normal operational conditions, in which the binned engine model data has been generated by dividing fuel rail pressure data of engine model data obtained from the common rail internal combustion engine into a predetermined number of engine speed bins, the engine model data comprises fuel rail pressure model data indicative of a fuel rail pressure of the fuel rail and engine speed model data indicative of an engine speed of the engine, the predetermined number of engine speed bins are derived from the engine speed data during a sampling time period, and the binned engine model data is indicative of frequency of occurrence of fuel rail pressures within each bin, the detection system comprising:

a data interface configured to receive, from an engine management system of the common rail internal combustion engine, engine test data obtained periodically during operation of the common rail internal combustion engine, the engine test data comprising fuel rail pressure test data indicative of a fuel rail pressure of the fuel rail and engine speed test data indicative of an engine speed of the engine;

a memory configured to store the engine test data, the engine test data being accumulated over a detection time period; and a processor configured to:

divide the fuel rail pressure test data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;

generate, for each bin of the predetermined number of bins, statistical attribute test data based on the binned engine data;

compare, for each bin, the statistical attribute test data with the statistical attribute model data of the normal operation model; and generate an alert based on if the comparison between the statistical attribute test data and the statistical attribute model data of the normal operation model over the detection time period meets a predetermined condition.

Although a variety of techniques and examples of such techniques have been described herein, these are provided by way of example only and many variations and modifications on such examples will be apparent to the skilled person and fall within the spirit and scope of the present invention, which is defined by the appended claims and their equivalents.

What is claimed is:

1. A method for generating a normal operation model indicative of a normal operational condition of a fuel rail of a common rail internal combustion engine, the method comprising:

receiving, from an engine management system of the common rail internal combustion engine via a data interface, engine model data obtained periodically during operation of the common rail internal combustion engine, the engine model data comprising fuel rail pressure data indicative of a fuel rail pressure of the fuel rail and engine speed data indicative of an engine speed of the engine;

storing the engine model data in a memory, the engine model data being accumulated over a sampling time period;

dividing, by a processor, the fuel rail pressure data into a predetermined number of engine speed bins derived from the engine speed data during the sampling time period so as to generate binned engine model data indicative of frequency of occurrence of fuel rail pressures within each bin;

generating, by the processor for each bin of the predetermined number of bins, statistical attribute model data based on the binned engine model data;

generating, by the processor, the normal operation model based on the statistical attribute model data for each bin when taken together; and storing, in the memory, the normal operation model for comparison with engine test data accumulated over a detection time period for enabling detection of an anomaly in an operational condition of the fuel rail based on comparison between the engine test data accumulated over the detection time period and the statistical attribute model data of the normal operation model.

2. A method according to claim 1, comprising determining, by the processor, if the engine speed of the engine speed data is within a predetermined peak torque range, and if not, discarding the associated engine model data.

3. A method according to claim 2, in which:
the engine model data comprises engine throttle data indicative of a throttle value of the engine, the engine throttle data being associated with the engine speed data, and
the method comprises determining, by the processor, if the throttle value of the engine throttle data is greater than or equal to a throttle value threshold, and if not, discarding the associated engine model data.

4. A method according to claim 2, in which:
the engine model data comprises engine load data indicative of an engine load value of the engine, the engine load data being associated with the engine speed data, and
the method comprises determining, by the processor, if the engine load value of the engine load data is greater than or equal to a engine load value threshold, and if not, discarding the associated engine model data.

5. A method according to claim 1, comprising removing, by the processor, before dividing the fuel rail pressure data into the predetermined number of bins, a portion of the engine model data that lies within a fuel rail pressure outlier threshold range from at least one of a lowest value of the fuel rail pressure data and a highest value of the fuel rail pressure data of the engine model data.

6. A method according to claim 1, in which generating the statistical attribute model data comprises fitting a normal Gaussian distribution to the binned engine model data for each bin to determine the mean value of frequency of occurrence of fuel rail pressure and standard deviation of the frequency of occurrence of the fuel rail pressure of the fuel rail pressure data in each bin.

7. A method according to claim 1, in which generating the statistical attribute data comprises determining, for each bin, one or more percentile ranges of frequency of occurrence of fuel rail pressure of the fuel rail pressure data for the binned engine data.

8. A method according to claim 1, comprising performing the method for a plurality of common rail internal combustion engines each having the same common attribute so as to generate a normal operation model for the plurality of common rail internal combustion engines.

9. A method for detecting an anomaly in an operational condition of a fuel rail of a common rail internal combustion engine based on comparison with a normal operation model generated according to claim 1, the method comprising:
receiving, from an engine management system of the common rail internal combustion engine via a data interface, engine test data obtained periodically during operation of the common rail internal combustion engine, the engine test data comprising fuel rail pressure data indicative of a fuel rail pressure of the fuel rail and engine speed data indicative of an engine speed of the engine;
storing the engine test data in a memory, the engine test data being accumulated over a detection time period;
dividing, by a processor, the fuel rail pressure data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;
generating, by the processor for each bin of the predetermined number of bins, statistical attribute test data based on the binned engine test data;
comparing, by the processor for each bin, the statistical attribute test data with the statistical attribute model data of the normal operation model; and
generating, by the processor, an alert based on if the comparison between the statistical attribute test data and the statistical attribute model data of the normal operation model over the detection time period meets a predetermined condition.

10. A method according to claim 9, comprising determining, by the processor, if the engine speed data is within a predetermined peak torque range, and if not, discarding the associated engine test data.

11. A method according to claim 10, in which:
the engine test data comprises engine throttle data indicative of a throttle value of the engine, the engine throttle data being associated with the engine speed data, and
the method comprises determining, by the processor, if the throttle value of the engine throttle data is greater than or equal to a throttle value threshold, and if not, discarding the associated engine test data.

12. A method according to claim 10, in which:
the engine test data comprises engine load data indicative of an engine load value of the engine, the engine load data being associated with the engine speed data, and
the method comprises determining, by the processor, if the engine load value of the engine load data is greater than or equal to a engine load value threshold, and if not, discarding the associated engine test data.

13. A method according to claim 9, in which comparing the statistical attribute test data with the statistical attribute model data of the normal operation model comprises:
determining, by the processor for each bin, the mean value of frequency of occurrence of fuel rail pressure from the fuel rail pressure data in each bin; and
comparing the mean value of frequency of occurrence of the fuel rail pressure for each bin of the statistical attribute test data with the mean value of frequency of occurrence of the fuel rail pressure of the corresponding bin of the statistical attribute data from the normal operation model.

14. A method according to claim 13, comprising determining, by the processor, for each bin, if an anomaly threshold difference between the mean value of frequency of occurrence of the fuel rail pressure statistical attribute test data for that bin and the mean value of frequency of occurrence fuel rail pressure of the corresponding bin of the statistical attribute model data from the normal operation model is greater than or equal to a threshold amount, and if so, flagging that bin.

15. A method according to claim 14, in which the predetermined condition corresponds to the number of flagged bins being greater than or equal to an anomaly threshold number.

16. A method according to claim 15, in which generating the alert comprises:
generating a high pressure alert if the difference between the mean frequency of occurrence of the statistical attribute detection data and the mean frequency of occurrence of the corresponding bin of the statistical attribute data from the normal operation model of the flagged bins is positive; and
generating a low pressure alert if the difference between the mean frequency of occurrence of the statistical attribute detection data and the mean frequency of occurrence of the corresponding bin of the statistical attribute data from the normal operation model of the flagged bins is negative.

17. A method according to claim 9, in which:

the method is carried out every detection time period sequentially;

generating the alert is based on a windowed time period comprising a sequence of the detection time periods, the windowed time period moving over time with respect to the detection time periods of the sequence of detection time periods; and generating the alert comprises turning on the alert if a number of detection time periods for which the predetermined condition is met within the windowed time period is greater than or equal to a first threshold number.

18. A method according to claim 17, in which:

generating the alert comprises turning off the alert if a number of detection time periods for which the predetermined condition is not met within the windowed time period is greater than or equal to a second threshold number.

19. A method for detecting an anomaly in an operational condition of a fuel rail of a common rail internal combustion engine based on comparison with a normal operation model, the normal operation model comprising statistical attribute model data previously generated from binned engine model data of the common rail internal combustion engine operating under normal operational conditions, in which the binned engine model data has been generated by dividing fuel rail pressure data of engine model data obtained from the common rail internal combustion engine into a predetermined number of engine speed bins, the engine model data comprises fuel rail pressure model data indicative of a fuel rail pressure of the fuel rail and engine speed model data indicative of an engine speed of the engine, the predetermined number of engine speed bins are derived from the engine speed data during a sampling time period, and the binned engine model data is indicative of frequency of occurrence of fuel rail pressures within each bin, the method comprising:

receiving, from an engine management system of the common rail internal combustion engine via a data interface, engine test data obtained periodically during operation of the common rail internal combustion engine, the engine test data comprising fuel rail pressure test data indicative of a fuel rail pressure of the fuel rail and engine speed test data indicative of an engine speed of the engine;

storing the engine test data in a memory, the engine test data being accumulated over a detection time period;

dividing, by a processor, the fuel rail pressure test data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;

generating, by the processor for each bin of the predetermined number of bins, statistical attribute test data based on the binned engine data;

comparing, by the processor for each bin, the statistical attribute test data with the statistical attribute model data of the normal operation model; and generating, by the processor, an alert based on if the comparison between the statistical attribute test data and the statistical attribute model data of the normal operation model over the detection time period meets a predetermined condition.

20. A method according to claim 19, in which the common rail internal combustion engine is a diesel engine.

21. A computer program comprising instructions which, when executed by a computer, cause the computer to carry out the method of claim 1.

22. A non-transitory tangible computer-readable media having stored thereon a computer program according to claim 21.

23. A computer program comprising instructions which, when executed by a computer, cause the computer to carry out the method of claim 9.

24. A non-transitory tangible computer-readable media having stored thereon a computer program according to claim 23.

25. A computer program comprising instructions which, when executed by a computer, cause the computer to carry out the method of claim 19.

26. A non-transitory tangible computer-readable media having stored thereon a computer program according to claim 25.

27. A model generating system for generating a normal operation model indicative of a normal operational condition of a fuel rail of a common rail internal combustion engine, the system comprising:

a data interface configured to receive, from an engine management system of the common rail internal combustion engine, engine model data obtained periodically during operation of the common rail internal combustion engine, the engine model data comprising fuel rail pressure data indicative of a fuel rail pressure of the fuel rail and engine speed data indicative of an engine speed of the engine;

a memory configured to store the engine model data, the engine model data being accumulated over a sampling time period; and a processor configured to:

divide the fuel rail pressure data into a predetermined number of engine speed bins derived from the engine speed data during the sampling time period so as to generate binned engine model data indicative of frequency of occurrence of fuel rail pressures within each bin;

generate, for each bin of the predetermined number of bins, statistical attribute model data based on the binned engine model data; and generate the normal operation model based on the statistical attribute model data for each bin when taken together, in which the memory is configured to store the normal operation model for comparison with engine test data accumulated over a detection time period for enabling detection of an anomaly in an operational condition of the fuel rail based on comparison between the engine test data accumulated over the detection time period and the statistical attribute model data of the normal operation model.

28. A detection system for detecting an anomaly in an operational condition of a fuel rail of a common rail internal combustion engine based on comparison with a normal operation model generated using the system of claim 27, the detection system comprising:

a data interface configured to receive, from an engine management system of the common rail internal combustion engine, engine test data obtained periodically during operation of the common rail internal combustion engine, the engine test data comprising fuel rail pressure data indicative of a fuel rail pressure of the fuel rail and engine speed data indicative of an engine speed of the engine;

a memory configured to store the engine test data, the engine test data being accumulated over a detection time period; and a processor configured to:

divide the fuel rail pressure data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;

generate, for each bin of the predetermined number of bins, statistical attribute test data based on the binned engine test data;

compare, for each bin, the statistical attribute test data with the statistical attribute model data of the normal operation model; and generate an alert based on if the comparison between the statistical attribute test data and the statistical attribute model data of the normal operation model over the detection time period meets a predetermined condition.

29. A detection system for detecting an anomaly in an operational condition of a fuel rail of a common rail internal combustion engine based on comparison with a normal operation model, the normal operation model comprising statistical attribute model data previously generated from binned engine model data of the common rail internal combustion engine operating under normal operational conditions, in which the binned engine model data has been generated by dividing fuel rail pressure data of engine model data obtained from the common rail internal combustion engine into a predetermined number of engine speed bins, the engine model data comprises fuel rail pressure model data indicative of a fuel rail pressure of the fuel rail and engine speed model data indicative of an engine speed of the engine, the predetermined number of engine speed bins are derived from the engine speed data during a sampling time period, and the binned engine model data is indicative of frequency of occurrence of fuel rail pressures within each bin, the detection system comprising:

a data interface configured to receive, from an engine management system of the common rail internal combustion engine, engine test data obtained periodically during operation of the common rail internal combustion engine, the engine test data comprising fuel rail pressure test data indicative of a fuel rail pressure of the fuel rail and engine speed test data indicative of an engine speed of the engine;

a memory configured to store the engine test data, the engine test data being accumulated over a detection time period; and a processor configured to:

divide the fuel rail pressure test data into a predetermined number of engine speed bins during the detection time period so as to generate binned engine test data indicative of frequency of occurrence of fuel rail pressures within each bin, in which the predetermined number of bins corresponds to the same number of bins as those used for the normal operation model;

generate, for each bin of the predetermined number of bins, statistical attribute test data based on the binned engine data;

compare, for each bin, the statistical attribute test data with the statistical attribute model data of the normal operation model; and generate an alert based on if the comparison between the statistical attribute test data and the statistical attribute model data of the normal operation model over the detection time period meets a predetermined condition.

* * * * *